US007136502B2

(12) United States Patent
Rhoads et al.

(10) Patent No.: US 7,136,502 B2
(45) Date of Patent: *Nov. 14, 2006

(54) PRINTING MEDIA AND METHODS EMPLOYING DIGITAL WATERMARKING

(75) Inventors: Geoffrey B. Rhoads, West Linn, OR (US); Aruna B. Kumar, Camas, WA (US); Trent J. Brundage, Tigard, OR (US); Brett T. Hannigan, Menlo Park, CA (US); Tony F. Rodriguez, Portland, OR (US); J. Scott Carr, Tualatin, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/051,442

(22) Filed: Feb. 3, 2005

(65) Prior Publication Data

US 2005/0152578 A1 Jul. 14, 2005

Related U.S. Application Data

(63) Continuation of application No. 09/811,366, filed on Mar. 15, 2001, now Pat. No. 6,985,600, which is a continuation-in-part of application No. 09/127,502, filed on Jul. 31, 1998, now Pat. No. 6,345,104, which is a continuation-in-part of application No. 08/967,693, filed on Nov. 12, 1997, now Pat. No. 6,122,392, which is a continuation of application No. 08/614,521, filed on Mar. 15, 1996, now Pat. No. 5,745,604, which is a continuation of application No. 08/215,289, filed on Mar. 17, 1994, now abandoned, said application No. 09/811,366 and a continuation-in-part of application No. 09/498,223, filed on Feb. 3, 2000, now Pat. No. 6,574,350, is a continuation-in-part of application No. 09/287,940, filed on Apr. 7, 1999, now Pat. No. 6,580,819, said application No. 09/498,223 and a continuation-in-part of application No. 09/433,104, filed on Nov. 3, 1999, now Pat. No. 6,636,615, is a continuation-in-part of application No. 09/234,780, filed on Jan. 20, 1999, now abandoned, said application No. 09/811,366 and a continuation-in-part of application No. 09/553,112, filed on Apr. 20, 2000, now abandoned, , said application No. 09/811,366 and a continuation-in-part of application No. 09/633,587, filed on Aug. 7, 2000, now abandoned, and a continuation-in-part of application No. 09/631,409, filed on Aug. 3, 2000, now abandoned, and a continuation-in-part of application No. 09/629,401, filed on Aug. 1, 2000, now Pat. No. 6,522,770, and a continuation-in-part of application No. 09/619,264, filed on Jul. 19, 2000, now abandoned, and a continuation-in-part of application No. 09/571,422, filed on May 15, 2000, now Pat. No. 6,947,571, and a continuation-in-part of application No. 09/562,524, filed on May 1, 2000, now Pat. No. 6,724,912, and a continuation-in-part of application No. 09/562,516, filed on May 1, 2000, now abandoned, is a continuation-in-part of application No. 09/343,104, filed on Jun. 29, 1999, now abandoned, which is a continuation-in-part of application No. 09/314,648, filed on May 19, 1999, now Pat. No. 6,681,028, said application No. 09/811,366 and a continuation-in-part of application No. 09/689,289, filed on Oct. 11, 2000, and a continuation-in-part of application No. 09/640,806, filed on Aug. 17, 2000, now Pat. No. 6,438,231, is a continuation-in-part of application No. 09/567,405, filed on May 8, 2000, now abandoned, said application No. 09/811,366 and a continuation-in-part of application No. 09/803,167, filed on Mar. 9, 2001, now Pat. No. 6,961,442.

(60) Provisional application No. 60/131,005, filed on Apr. 22, 1999, provisional application No. 60/082,228, filed on Apr. 16, 1998, provisional application No. 60/071,983, filed on Jan. 20, 1998.

(51) Int. Cl.
    H04K 1/00        (2006.01)
(52) U.S. Cl. .......................................... 382/100; 283/72
(58) Field of Classification Search ................ 382/100, 382/135, 232; 380/51, 54, 55; 713/176; 283/72, 74, 75, 77, 85, 93, 94, 107, 109, 283/110, 111, 113, 901, 902; 428/195, 201, 428/203, 204, 206, 207, 211, 916, 919, 195.1, 428/211.1; 430/9, 10, 11, 13, 14, 15, 18; 503/227

See application file for complete search history.

(56) References Cited

U.S. PATENT DOCUMENTS 4,370,057 A * 1/1983 Lee .............................. 356/71

(Continued)

FOREIGN PATENT DOCUMENTS

DE  29 43 436 A1 * 5/1981

(Continued)

OTHER PUBLICATIONS

Guido, "Preventing Copying of Classified Information," *IBM Technical Disclosure Bulletin*, Vol. 19, No. 4, Sep. 1974, pp. 1469-1470.*

(Continued)

*Primary Examiner*—Andrew W. Johns
(74) *Attorney, Agent, or Firm*—Digimarc Corporation

(57) ABSTRACT

Stationery, or other printable media, is encoded with a digital watermark. The watermark is not conspicuous to a human observer of the media, yet conveys plural bits of auxiliary information when optically scanned and digitally processed. The watermark can be formed by ink-jet printing, or otherwise. The encoded information can be used for various purposes, including authenticating the document as an original, linking to associated on-line resources, and distinguishing seemingly-identical versions of the same document (document serialization).

22 Claims, 8 Drawing Sheets

U.S. PATENT DOCUMENTS

| | | | |
|---|---|---|---|
| 4,416,001 A | 11/1983 | Ackerman et al. | 369/44 |
| 4,591,707 A | 5/1986 | Stenzel et al. | 235/493 |
| 4,918,484 A | 4/1990 | Ujiie et al. | 355/41 |
| 5,091,966 A | 2/1992 | Bloomberg et al. | 382/21 |
| 5,161,829 A * | 11/1992 | Detrick et al. | 283/91 |
| 5,315,098 A | 5/1994 | Tow | 235/494 |
| 5,337,361 A | 8/1994 | Wang et al. | 380/51 |
| 5,380,044 A * | 1/1995 | Aitkens et al. | 283/67 |
| 5,471,533 A * | 11/1995 | Wang et al. | 380/51 |
| 5,500,715 A | 3/1996 | Ta et al. | 355/204 |
| 5,502,576 A | 3/1996 | Ramsay et al. | 358/444 |
| 5,652,626 A | 7/1997 | Kawakami et al. | 348/463 |
| 5,664,018 A | 9/1997 | Leighton | 380/54 |
| 5,687,236 A | 11/1997 | Moskowitz et al. | 380/28 |
| 5,698,333 A * | 12/1997 | Benoit et al. | 428/516 |
| 5,727,092 A | 3/1998 | Sandford, II et al. | 382/251 |
| 5,772,250 A * | 6/1998 | Gasper | 283/114 |
| 5,822,436 A | 10/1998 | Rhoads | 380/54 |
| 5,838,814 A * | 11/1998 | Moore | 382/115 |
| 5,848,155 A | 12/1998 | Cox | 380/4 |
| 5,848,413 A | 12/1998 | Wolff | 707/10 |
| 5,850,481 A | 12/1998 | Rhoads | 382/232 |
| 5,880,760 A | 3/1999 | Desie et al. | 347/55 |
| 5,919,730 A * | 7/1999 | Gasper et al. | 503/201 |
| 5,930,369 A | 7/1999 | Cox et al. | 380/54 |
| 6,103,353 A * | 8/2000 | Gasper et al. | 428/195 |
| 6,127,106 A | 10/2000 | Haydock et al. | 430/536 |
| 6,205,249 B1 | 3/2001 | Moskowitz | 382/232 |
| 6,243,480 B1 | 6/2001 | Zhao et al. | 382/100 |
| 6,246,776 B1 | 6/2001 | Merz et al. | 382/100 |
| 6,272,634 B1 | 8/2001 | Tewfik et al. | 713/176 |
| 6,276,771 B1 | 8/2001 | Kim et al. | 347/3 |
| 6,286,761 B1 * | 9/2001 | Wen | 235/468 |
| 6,291,829 B1 | 9/2001 | Allen et al. | 250/559.07 |
| 6,311,214 B1 | 10/2001 | Rhoads | 709/217 |
| 6,318,151 B1 | 11/2001 | Wang et al. | 73/25.01 |
| 6,318,827 B1 | 11/2001 | Brenner et al. | 347/9 |
| 6,334,678 B1 | 1/2002 | Daigneault et al. | 347/107 |
| 6,345,104 B1 | 2/2002 | Rhoads | 382/100 |
| 6,353,479 B1 | 3/2002 | Lubawy et al. | 358/1.13 |
| 6,522,770 B1 | 2/2003 | Seder et al. | 382/100 |
| 6,574,350 B1 | 6/2003 | Rhoads et al. | 382/100 |
| 6,585,341 B1 | 7/2003 | Walker et al. | 347/14 |
| 6,625,295 B1 | 9/2003 | Wolfgang et al. | 382/100 |
| 6,650,761 B1 | 11/2003 | Rodriguez et al. | 382/100 |
| 6,681,028 B1 | 1/2004 | Rodriguez et al. | 382/100 |
| 6,701,304 B1 | 3/2004 | Leon | 705/401 |
| 6,950,519 B1 | 9/2005 | Rhoads | 380/100 |
| 6,961,442 B1 | 11/2005 | Hannigan et al. | 382/100 |
| 6,968,057 B1 | 11/2005 | Rhoads | 380/59 |
| 6,970,573 B1 | 11/2005 | Carr et al. | 382/100 |
| 7,039,214 B1 | 5/2006 | Miller et al. | 382/100 |
| 7,054,461 B1 | 5/2006 | Zeller et al. | 382/100 |
| 7,054,462 B1 | 5/2006 | Rhoads et al. | 382/100 |
| 7,054,463 B1 | 5/2006 | Rhoads et al. | 382/100 |
| 7,058,697 B1 | 6/2006 | Rhoads | 709/217 |
| 2002/0085759 A1 | 7/2002 | Davies et al. | 382/203 |

FOREIGN PATENT DOCUMENTS

| | | |
|---|---|---|
| EP | 493091 A1 | 7/1992 |
| GB | 2346110 | 8/2000 |
| WO | WO 97/43736 A1 | 11/1997 |
| WO | WO 98/33658 A1 * | 8/1998 |
| WO | WO 98/56596 A1 * | 12/1998 |

OTHER PUBLICATIONS

Haslop, "Security Printing Techniques," *Optical Document Security*, Artech House, Inc., 1994, pp. 111-126.* van Renesse, "3DAS: A 3Dimensional-Structure Authentication System," *Proc. European Convention on Security and Detection*, May 1995, pp. 45-49.*

Cox et al, Secure Spread Spectrum Watermarking for Images, Audio and Video, IEEE, Jun. 1996, pp. 243-246.

* cited by examiner

PRINTING MEDIA AND METHODS EMPLOYING DIGITAL WATERMARKING

RELATED APPLICATION DATA

This application is a continuation of application Ser. No. 09/811,366, filed Mar. 15, 2001 (now U.S. Pat. No. 6,985,600), which is a continuation-in-part of each of the following applications:

Ser. No. 09/127,502, filed Jul. 31, 1998 (now U.S. Pat. No. 6,345,104), which is a continuation-in-part of Ser. No. 08/967,693, filed Nov. 12, 1997 (now U.S. Pat. No. 6,122,392), which is a continuation of Ser. No. 08/614,521, filed Mar. 15, 1996 (now U.S. Pat. No. 5,745,604), which is a continuation of Ser. No. 08/215,289, filed Mar. 17, 1994, now abandoned;

Ser. No. 09/498,223, filed Feb. 3, 2000 (now U.S. Pat. No. 6,574,350), which is a continuation in part of Ser. No. 09/287,940, filed Apr. 7, 1999 (now U.S. Pat. No. 6,580,819), which claims priority to 60/082,228, filed Apr. 16, 1998; said application Ser. No. 09/498,223 also is a continuation-in-part of application Ser. No. 09/433,104, filed Nov. 3, 1999 (now U.S. Pat. No. 6,636,615), which is a continuation in part of Ser. No. 09/234,780, filed Jan. 20, 1999 (abandoned), which claims priority to application 60/071,983 filed Jan. 20, 1998; and Ser. No. 09/553,112, filed Apr. 20, 2000 (attached as Appendix A, now abandoned), which claims priority from application 60/131,005, filed Apr. 22, 1999;

Ser. No. 09/562,516, filed May 1, 2000 (attached as Appendix B), now abandoned.

Ser. No. 09/562,524, filed May 1, 2000 (now U.S. Pat. No. 6,724,912);

Ser. No. 09/571,422, filed May 15, 2000 (now U.S. Pat. No. 6,947,571; international counterpart published as WO00/70585);

Ser. No. 09/619,264, filed Jul. 19, 2000 (attached as Appendix C, now abandoned);

Ser. No. 09/629,401, filed Aug. 1, 2000 (now U.S. Pat. No. 6,522,770);

Ser. No. 09/631,409, filed Aug. 3, 2000 (attached as Appendix D, now abandoned);

Ser. No. 09/633,587, filed Aug. 7, 2000 (now abandoned), which is a continuation-in-part of Ser. No. 09/343,104, filed Jun. 29, 1999 (abandoned in favor of continuation application Ser. No. 10/764,430), which is a continuation-in-part of Ser. No. 09/314,648, filed May 19, 1999 (now U.S. Pat. No. 6,681,028).

Ser. No. 09/640,806, filed Aug. 17, 2000 (now U.S. Pat. No. 6,438,231);

Ser. No. 09/689,289, filed Oct. 11, 2000 (attached as Appendix E), which is a continuation-in-part of Ser. No. 09/567,405, filed May 8, 2000 (abandoned);

Ser. No. 09/803,167, filed Mar. 9, 2001 (now U.S. Pat. No. 6,961,442).

Claims directed to blank paper media have earlier issued to the present assignee in U.S. Pat. Nos. 5,850,481, 5,822,436, and 6,111,954, and 6,438,231.

FIELD OF THE INVENTION

The present invention relates to steganographic encoding of substrates—such as blank paper, wherein the encoding is not apparent or conspicuous to human observers, yet is detectable by visible light scanning of the media.

BACKGROUND AND SUMMARY OF THE INVENTION

In a great variety of applications, it is desirable for documents and other substrates to convey digital information.

Printed bar codes are one way of encoding digital data on documents, but bar codes are unsuited for many applications due to aesthetics, etc. Magnetic stripes can be used in some circumstances, but again the stripe is conspicuous, and reading the stripe requires a reader device that is not generally available. Radio frequency ID (RFID) is another technology that is sometimes used, but the cost is prohibitive for most applications, and specialized readers are again required.

For those situations in which the marking needs to be both inconspicuous and low cost, digital watermarking offers a promising alternative. Digital watermarking involves making subtle changes to a substrate's appearance (e.g., by ink speckling, texturing, background printing, or other techniques detailed in the literature)—changes that generally pass unnoticed by human viewers but that can be sensed by optical techniques (e.g., webcams, scanners, digital cameras) and decoded by computer processing of the resulting image data to extract the encoded information. application Ser. No. 09/503,881 (now U.S. Pat. No. 6,614,914) details illustrative watermark encoding/decoding technology. A great number of other techniques are known to artisans in the field, and can be alternatively used. (The following specification commonly uses the term "watermarking" as shorthand for "digital watermarking." This steganographic form of digital data encoding is different than the paper watermarks that have, for centuries, been used in certain documents.)

The present assignee has filed many patent applications that have dealt with digital watermarking of paper and other substrates. The present application serves to compile these various works into a consolidated filing.

application Ser. No. 09/640,806 (now U.S. Pat. No. 6,438,231), with priority back to application Ser. No. 08/215,289, filed Mar. 17, 1994 (through intervening U.S. Pat. Nos. 5,822,436 and 6,111,954) teaches that blank photographic paper and photographic film can be pre-processed—before exposure—to encode digital watermark information. When the paper/film is thereafter developed, the encoded information permeates the exposed image. That application also discusses substrate texturing as a way of effecting digital watermarking.

application Ser. No. 09/127,502 (now U.S. Pat. No. 6,345,104) teaches how a watermark pattern can be formed in the background of a printed document, such as by speckling small droplets of ink, or printing a mesh or weave of very thin lines. Ink-jet, intaglio, offset litho, letterpress, xerography, and other printing processes can be used. Such printing can be used to impart a tint to paper while simultaneously encoding auxiliary data (the watermark payload). Watermark encoding by texturing, such as by use of embossing pressure rollers or intaglio plates, is also discussed. Such processes can be performed by the end-user of the paper, or earlier, e.g., by a paper manufacturer. Moreover, they can be applied to the base substrate, or to a laminate layer (which may be clear) that is applied to the base substrate. The background patterning can encode both the auxiliary data payload, and calibration/orientation information that helps the decoder determine (and compensate for) rotation or scaling of the scan data prior to decoding. The encoding can extend across the entire document/substrate, or can be restricted to certain areas.

application Ser. No. 09/562,524 (now U.S. Pat. No. 6,724,912) particularly considers watermarking of laminate layers and synthetic substrates by techniques including opacification, laser ablation and cutting, and gravure printing. This application also considers how a single sheet of blank media can be encoded to convey different watermarks in different regions.

application Ser. No. 09/562,516 details a variety of techniques for digitally encoding blank media, including printing watermark patterns with inks whose spectral response extends into UV or IR, and printing with combinations of inks. This application also recognizes that the selection of inks can be tailored to the spectra of expected illumination sources.

application Ser. No. 09/553,112 details how particular line patterns can be designed to encode desired digital watermark information on documents and substrates. According to one method, a watermark tile is first defined—specifying luminance values in different regions. Lines are then formed between different areas in accordance with the values in the watermark tile.

applications Ser. Nos. 09/571,422 and 09/633,587 detail how a printed document, such as a business card, greeting card, product packaging, postal mail, catalog, magazine, credit card, office document, driver's license, book jacket, event ticket, etc., can be encoded with a digital watermark that corresponds to an electronic address. When presented to an imaging system, such as a webcam-equipped computer or other device, the resulting image data is processed to decode the watermark. The device then establishes a link to the electronic address in order to provide the user with additional information or content related to the original document, or to trigger an associated action. (The electronic address can be literally encoded in the watermark. More commonly, however, the watermark encodes an identifier. After detection, the decoding device uses this identifier to access a data structure, such as a remote database, to obtain a corresponding address.) These applications also contemplate that the encoding can be applied to blank media, such as blank magazine paper stock, and blank Post-It brand adhesive note pages. After end use by a consumer, the encoding persists, permitting linking or other watermark-based functionality.

application Ser. No. 09/631,409 expands on the foregoing—particularly considering systems that link from invoices, bank statements and checks, and other account paperwork to associated on-line resources. By such arrangements, consumers can review billing history, make electronic payments, correspond with the banking or commercial institution, print completed checks, etc.

application Ser. No. 09/498,223 (now U.S. Pat. No. 6,574,350) and Ser. No. 09/433,104 (now U.S. Pat. No. 6,636,615) detail "fragile" digital watermarks, i.e., watermarks that are designed to be lost, or to degrade in a predictable manner, when subject to certain forms of processing (e.g., scanning and printing, or photocopying). A watermark may be made fragile in numerous ways. One form of fragility relies on low watermark amplitude. That is, the strength of the watermark is only marginally above the minimum needed for detection. If any significant fraction of the signal is lost, as typically occurs in photocopying operations, the watermark becomes unreadable. Another form of fragility relies on the watermark's frequency spectrum. High frequencies are typically attenuated in the various sampling operations associated with digital scanning and printing. Even a high. amplitude watermark signal can be significantly impaired, and rendered unreadable, by such photocopying operations. Fragile watermarks can be combined with more traditional, "robust" watermarks within a single document. The former serves to authenticate the document as an original. The latter serves to tag the document with a persistent set of auxiliary data (which can be used for any of the purposes for which watermarks are used).

application Ser. No. 09/689,289 details particular applications of document watermarking in fields relating to stationary, postal mail and postage. Exemplary applications include document serialization, authentication, copy-control, envelope franking, internet linking, encoding of delivery address information, etc. Again, watermarking of blank printing stock is contemplated. Large lots of documents can be watermarked with the same data payload, or each sheet can convey a unique watermark payload. Corporate stationary can be marked with a fragile watermark to permit a genuine document to be distinguished from a photocopy or other reproduction.

application Ser. No. 09/619,264 details that printers (including fax machines, photocopiers, etc.) can include optical sensors and decode watermark information from blank paper stock. This watermark can signal to the printer the particular type of paper about to be printed (e.g., glossy photo stock, corporate letterhead, etc.). The printer can then tailor its printing attributes in accordance with the particular paper being printed. The substrate watermark can be implemented using a variety of techniques, including clear inking.

application Ser. No. 09/629,401 (now U.S. Pat. No. 6,522,770) details how office documents, such as printed spreadsheets, can include a background (or other) watermark pattern. When presented to a webcam, or other such device, an associated computer can decode the watermark and, from this information, identify where the document is stored. The document can then be loaded from such storage, and a corresponding program launched to permit on-screen review or editing. Meta-data associated with the document can also be recalled by reference to the watermark. The encoding of the watermark in the printed output can be effected transparently to the user, such as by the application program (Excel), by printer driver software, or by the printer itself.

application Ser. No. 09/803,167, filed Mar. 9, 2001 (now published as US 20020126871) details how a substrate can be treated so that, when printed with unwatermarked text or imagery, the resulting document will be watermarked. This can be done, e.g., by locally tailoring the ink absorption attributes of different regions on the page, such as by a finely patterned waxy coating.

DETAILED DESCRIPTION

Figure 1:
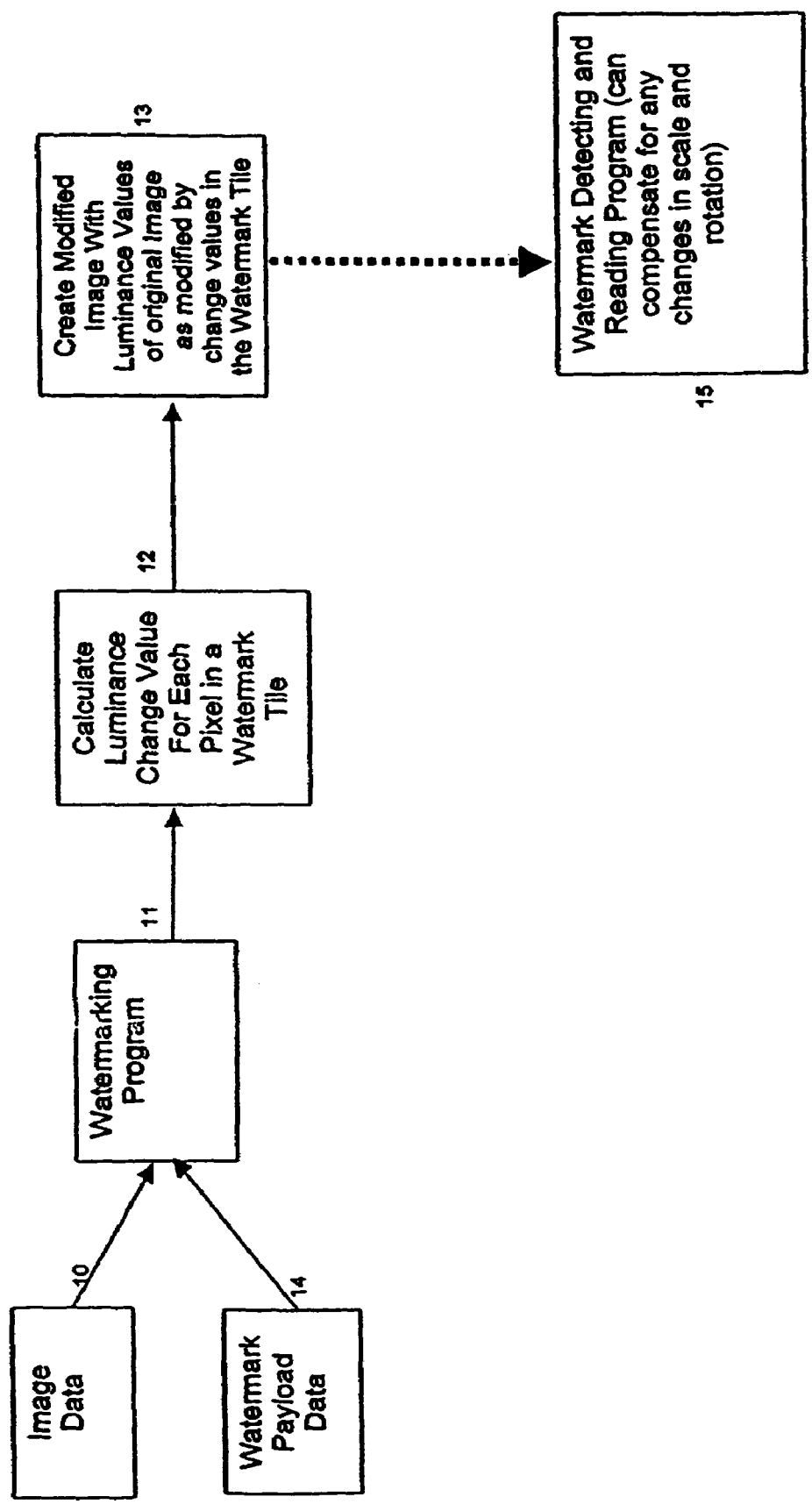
FIG. 1 shows a prior art watermarking system.

In accordance with one aspect, an embodiment of the invention is a substrate to which final user printing can later be applied to yield a final printed object. The substrate is characterized by having been processed prior to final user printing to yield a steganographic digital watermark pattern thereon. This pattern does not impair subsequent use of the substrate, yet conveys plural bits of digital information. The presence of such information is not apparent to a human observer of the substrate, but can be detected by visible-light scanning of the substrate to yield data from which the plural bit information can be recovered.

The steganographic digital watermark pattern can be formed by ink, which may be, e.g., speckled across at least part of the substrate. Or the ink can form a mesh of thin lines. (For example, the mesh can comprise a single pattern that is tiled across the substrate, with the pattern being arranged so that lines located at adjoining tile edges meet without discontinuity.) Such inking can serve to impart a colored tint to the substrate, and may be applied by known ink-jet printing processes.

The watermark pattern may also be defined by generating a tile specifying one of N luminance values for each of plural different areas, consolidating the N values down to M (where M<N), and then forming lines between such areas in response to the consolidated luminance values. The user may specify line criteria to be used, including whether the lines are straight or curved, and if curved parameters therefor.

The ink used in forming the watermark pattern can be of known types, including clear. The ink may be chosen to optimize watermark detection in the presence of expected illumination spectra, e.g., the illumination cast by a computer monitor.

In other embodiments the steganographic digital watermark pattern can be formed by texturing the substrate (e.g., by force of pressure, by embossing, by an intaglio plate, etc.).

In still other embodiments, the substrate can be processed to locally change its ink absorption ability.

In yet other embodiments, the substrate can include a photographic emulsion, and the watermark pattern can be formed by exposing the emulsion with a pattern (e.g., a noise-like pattern) and thereafter developing the emulsion to make the pattern detectable.

The pattern can be formed on the substrate prior to delivery of the substrate to an end user, e.g., by a producer or supplier of the substrate. Alternatively, the pattern can be formed on the substrate after such delivery.

In some embodiments, the digital watermark pattern may degrade when photocopied, so that the printed object can be distinguished from a photocopy. Such embodiments may also include a second digital watermark pattern—one that is robust against photocopying.

Depending on application, the digital watermark pattern may extend across an entire face of the substrate, or be restricted to certain areas. Likewise, only one side of the substrate—or both—can include watermark patterns. In substrates with laminate construction, the digital watermark pattern may be manifested in a laminate layer. In some embodiments, different regions of the substrate can convey different watermark payloads.

The plural bits of digital information represented by the watermark pattern can comprise an identifier that serves to convey information indicative of an electronic address. More particularly, the identifier can comprise a pointer into a remote data structure, with the remote data structure storing an electronic address corresponding to the substrate.

In some embodiments, the watermark pattern on the substrate may also convey a steganographic orientation signal.

To permit a document printed on such a substrate to be uniquely identified from other—seemingly identical—printed documents, the plural bits of digital information represented by the watermark can comprise serialization information. Alternatively, the digital information can serve to identify the type of substrate to a printer, so that the printer can tailor print parameters accordingly.

The watermark pattern may be formed on a side of the substrate opposite that to which final end-user printing is later applied.

Secret knowledge may be required to decode the plural bits of digital information from the substrate. Thus, a first end user cannot decode information encoded on a substrate of a second end user, and vice versa.

The substrate can take different forms, including an envelope, stationery, etc. The substrate can also comprise printing stock, such as for a security document (e.g., a banknote) or for newspapers and magazines. Or the substrate can comprise a printed check.

The summaries of the priority applications noted earlier are necessarily abbreviated and incomplete; the reader is referred to the cited applications for their full disclosures. Moreover, the disclosures discussed in connection with one application or technology may have antecedents in earlier applications. Again, the reader is referred to the cited applications.

Certain of the cited applications note that document identification technologies other than digital watermarking (e.g., bar codes, RFIDs, etc.) can be used in certain circumstances.

The above-referenced patents and patent applications are incorporated herein as if set forth in their entireties.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof. (Claims follow appendices.)

APPENDIX A

Image Patterns that Constitute Digital Watermarks

Field of the Invention:

The present invention relates to steganography and more particularly to digital images that contain digital watermark data.

Background of the Invention:

Steganographic techniques for unobtrusively embedding digital data in images are well known. For example, widely used image editing programs such as Adobe *PhotoShop* which is marketed by Adobe Corporation, *CorelPHOTOPAINT* which is marketed by Corel Corporation, and *Microgrfix Webtricity* which is marketed by Micrographic Corporation contain plug-ins or subroutines which can add watermarks to images and which can read watermarks. Systems for adding watermarks to images are described in many patents including U.S. patent 5,636,292, U.S. patent 5,862,260, and U.S. patent 5,748,783. Such systems are also described in the technical literature such as in the "Communications of the ACM" published July 1998 Vol. 41, No 7 pages 31 to 77. The teaching and information in the above referenced prior material is hereby incorporated herein as background information.

In general in watermark detecting and reading systems the original image is considered to be noise when the system is detecting and reading the actual watermark data. A major task faced by the designers of watermark reading systems is how to detect a relatively weak watermark signal in view of the noise signal created by the image data itself.

Many documents and images include a background image. In some documents such as checks, passports, etc. the background image is used as a security feature to inhibit alteration or duplication. In many documents, the background consists of a series of lines. Such lines are designed to both present a pleasing appearance and to inhibit duplication or alteration of the documents. Co-pending US patent applications 09/074,034, filed May 6, 1998 and 09/127,503, filed July 31, 1998 (which correspond to PCT/US99/08252, now published as WO99_____ and PCT/US99/14532) describe how the width of lines can be varied to carry a watermark.

Prior art watermarking technology modifies an image by changing the luminance values of the pixels in the image in such a way that the modified image carries digital data (referred to as watermark payload data). As shown in Figure 1, the prior art watermarking systems begin with an image 10 and watermark payload data 14. A watermarking program 11 calculates a luminance change value 12 for each pixel in a APPENDIX A
09/553,112, filed 4/20/00 watermark tile. The input image is divided into areas corresponding to the size of the watermark tile. A modified image is generated by taking the luminance values in each area of the original image and changing it by an amount equal to the change values in the corresponding position in the watermark tile. Watermark detecting and reading program 14 can read the watermark payload data by detecting the changes in luminance values while considering the values from the original image as "noise". Watermark detecting and reading program 14 can read the payload data not withstanding changes in scale and rotation of the modified image. Such a system is for example shown in co-pending patent application serial number SN 09/503,881 filed February 14, 2000 (the material in which is hereby incorporated herein by reference).

*Summary of the Present Invention:*

*The present invention is directed to designing a pattern of lines in such a manner that the pattern itself carries watermark payload data. That is, with the present invention lines are drawn so that the resulting image carries watermark data. This is in contrast to the prior art where watermark payload data is used to modify a preexisting image. With the present invention, a conventional watermarking program is used to calculate luminance change values in a watermark tile (i.e. luminance change values corresponding to a desired watermark payload). The luminance change values are used to control the formation of lines on an output image. The weight, length and character (i.e. straight or wavy etc.) of the lines can be selected to create any desired aesthetic effect so long as the placement of the lines is controlled by the luminance change values in the watermark tile. With the present invention lines are drawn to form an image in such a way that the placement and direction of the lines that carries watermark data. The payload data can be read from an image created according to the present invention using a conventional watermark reading program.*

*With the present invention as a first step, the luminance change values in a watermark tile are calculated using a watermarking program. Next the values so calculated are quantified into a relative small number of levels. For example, the watermarking change values calculated by the watermarking program may have 256 different values (0 to 255). The present invention takes those values and quantify them into ten different levels. An output image is divided into relatively large areas (called bumps), one bump for each pixel in the watermark payload tile. For example, each bump area in the output image could be one hundred pixels by one hundred pixels. Each bump area in the output is given an index value corresponding to the luminance change value of the corresponding pixel in the payload tile area. Starting at an arbitrary bump area in the output image, a line is drawn to the surrounding bump area with the highest index value and the index value of the bump area where the line started is decreased by one. The process then repeats from the bump area where the line ended. The process can stop when all bump area have reached an index value of zero, or sooner if a less robust watermark is acceptable.*

APPENDIX A
09/553,112, filed 4/20/00

Detailed Description:

The present invention takes the luminance change values in a watermark tile that are calculated by a prior art watermarking program and uses these values to control the construction of lines on an output image. The calculation of the luminance change values is not part of the present invention and these values may be calculated using prior art watermarking programs. For example, the luminance change values can be calculated as described in patent application serial number SN 09/503,881 filed February 14, 2000 which is hereby incorporated herein by reference. It is noted that in many prior art systems the watermark data (i.e. the watermark tile) is replicated many times over an image. The first embodiment of the invention described herein does not duplicate or replicate the watermark data in the output image; however, as explained later in other embodiments of the invention the watermark data can be replicated in multiple patterns. The present invention relates only to the construction of an image carrying watermark payload data. The watermark payload data can be read from the output image using a conventional prior art watermark reading program.

Figure 2:
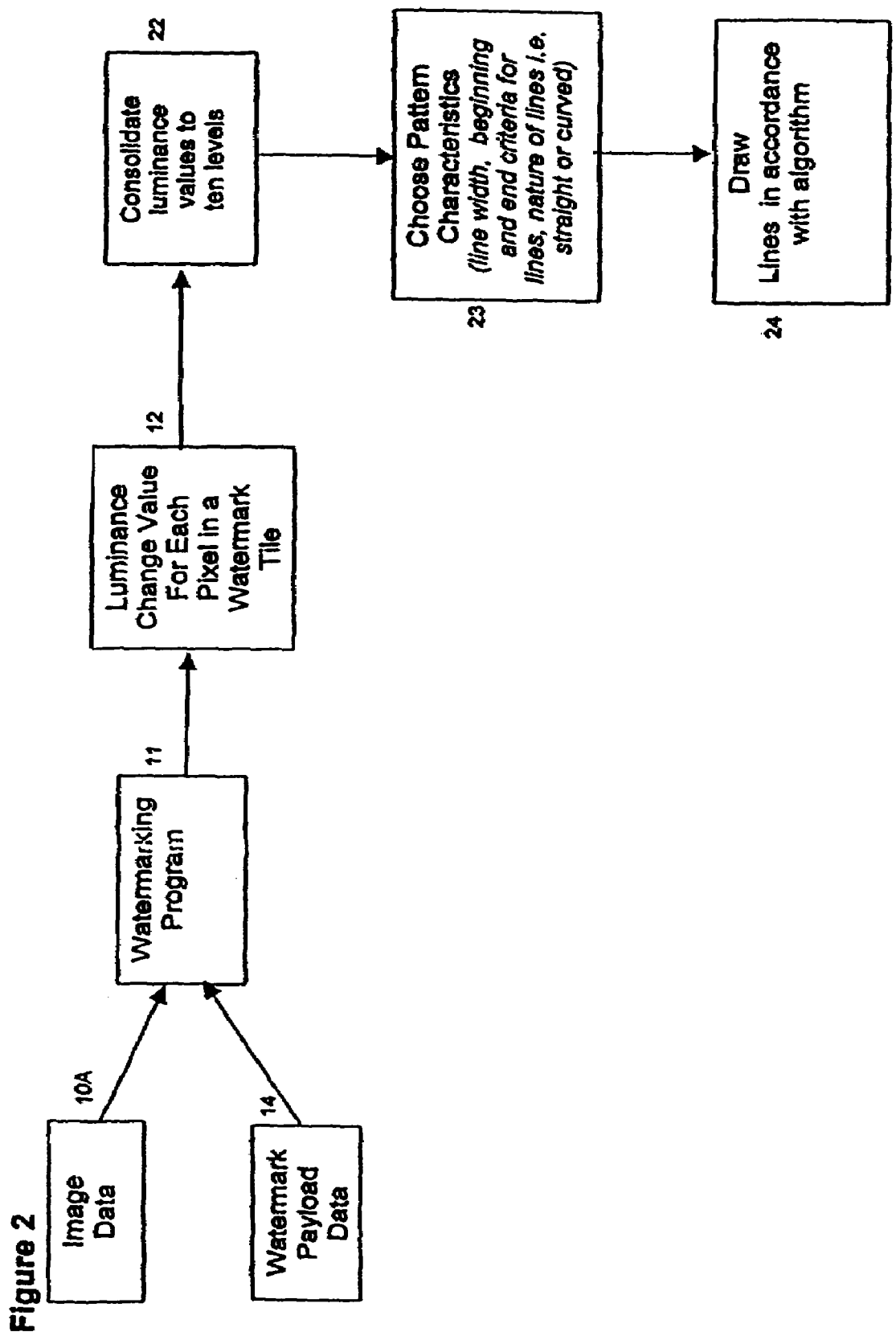
FIG. 2 is an overall system diagram of an embodiment of the present invention.

As shown in Figure 2, a preferred embodiment of the present invention utilizes a watermarking program 11 to calculate luminance change values 12 for each pixel in a watermark tile. The luminance change values 12 in the watermark tile corresponding to a particular watermark payload 14. With the present invention the original image (herein called a pseudo image) presented to the watermarking program 12 can be a uniformly gray image 10A, that is, an image which has a selected luminance value which is uniform over the entire image. The embodiment described here only uses a pseudo image 10A for the convenience since conventional watermarking programs begin with an image. The effect is the same as if there were no image. In alternate embodiments, the watermark change values 12 could be calculated directly without need for a pseudo image 10A.

The luminance change values in a watermark tile calculated by prior art watermarking program 11 has 256 (0 to 255) luminance levels. To simplify operation of the system, with the present invention these values are quantified into a much smaller number of levels. For example, the 256 levels can be quantified into ten levels as indicated by box 22 in Figure 2. The number of levels used (and in fact whether or not there is any reduction in the number of levels) is determined by the degree of complexity one is willing to have in the program. One could use all the levels in the normal watermark tile; however, such a program would require much more time to generate a pattern. Alternately, one could design a watermarking program that only generates ten change values. Such a program would in effect be simpler than the watermarking programs now in commercial programs such as those previously referenced.

*One must choose the characteristics of the lines one wants to use. A significant advantage of the present invention is that the characteristics of the lines can be chosen for aesthetic reasons. For purposes of simplicity of illustration, the lines chosen for the illustrative example shown herein are straight and which have a weight of 4 points. Alternative embodiments can use may different types of lines as explained later.*

Figure 3:
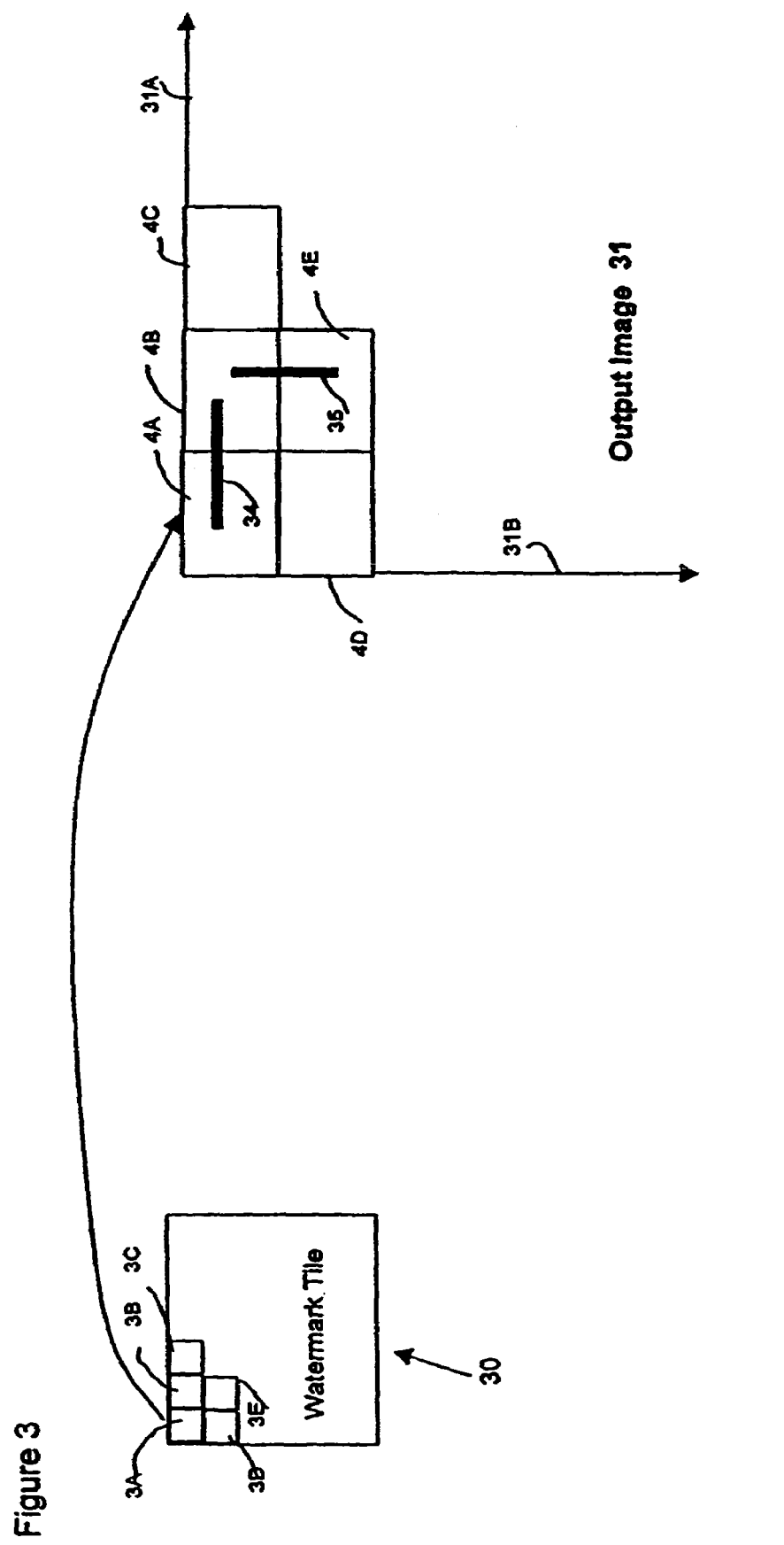
FIG. 3 illustrates correspondence between luminance values in a watermark tile, and areas in the output image.

*As shown in Figure 3, the present invention uses a watermark tile 30 created by a watermarking program 11. The luminance change values in the watermark tile 30 are used to control the drawings of lines in an output image 35. For convenience and clarity of illustration only five pixels 3A to 3E are illustrated in Figure 3. It should be understood that the watermark tile has many more pixels than shown. For example, a watermark tile generated by a conventional watermarking program has over one thousand pixels. The particular and exact size of the watermark tile is of no particular significance to the present invention; however, it does affect the number of areas in the output image.*

*The output image is divided into areas or bumps as shown in Figure 3. For reference the areas or bumps that are illustrated in Figure 3 are designated as 4A, 4B, 4C, 4D and 4E. Each area can for example be 100 pixels by 100 pixels. The arrows 31A and 31B in Figure 3 illustrate that the output image has many more area than the five areas 4A to 4E explicitly shown in Figure 3. There is one area in output image 31 for each pixel in watermark tile 30.*

*The luminance change values in watermark tile 30 are first quantified into ten levels as indicated by block 22 in Figure 2. It is noted that in the preferred embodiment the luminance change values in watermark tile 30 are generated by a conventional watermarking program, have luminance change values that range from 0 to 255. It is difficult to deal with that many levels with the present algorithm and it has been found that satisfactory results can be obtained by quantifying the values into many less levels. For example, in preferred embodiment, the luminance values in the watermark tile are quantified into ten levels. That is, the values from 0 to 255 are divided into ten levels and each pixel is assigned an index value depending upon which range its luminance change value. (it is noted that the number ten is arbitrary and more or less levels can be selected to meet the needs of a particular embodiment).*

Figure 5:
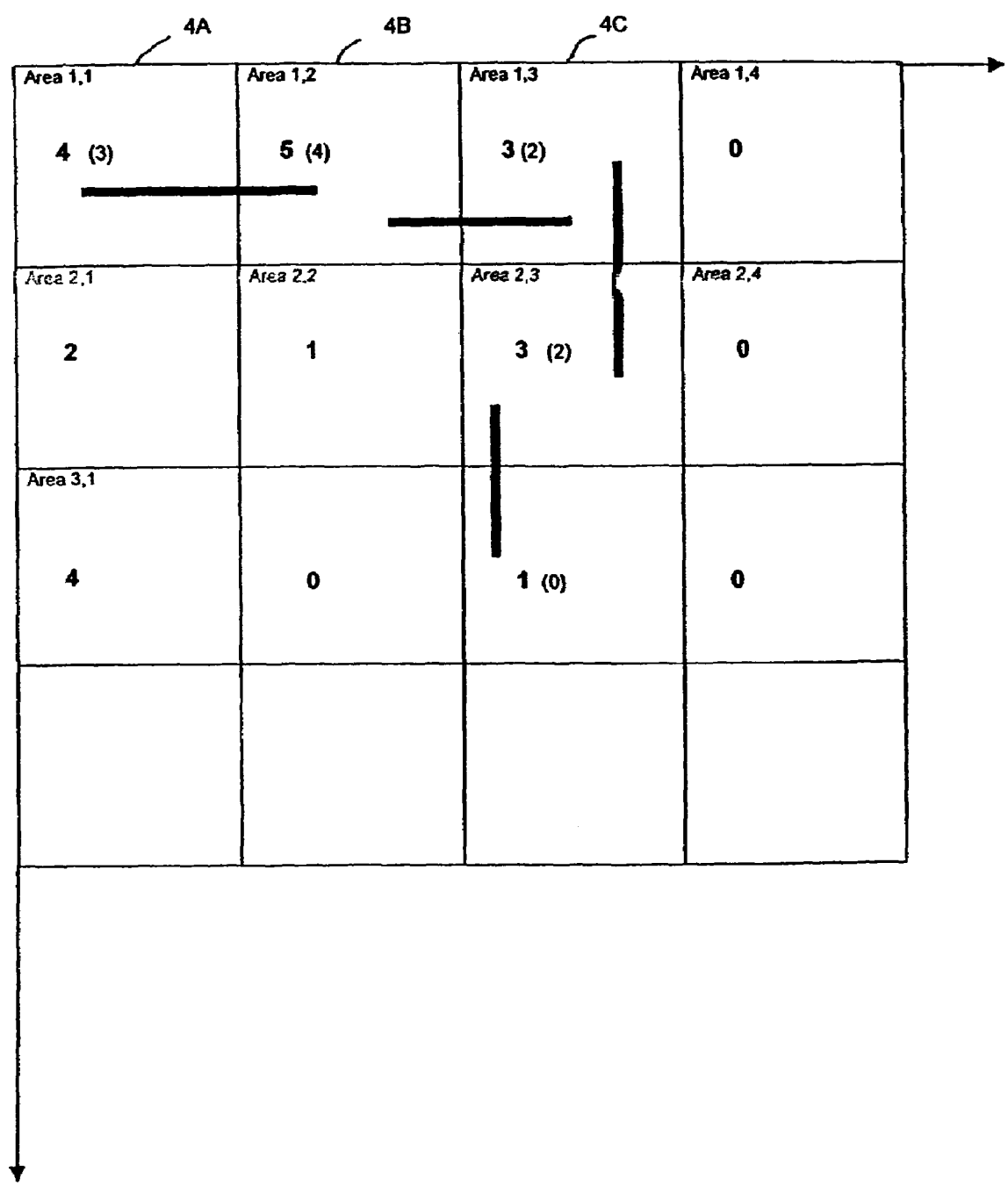
FIG. 5 shows the lines in an output image.

*The output image has one area (or bump) for each pixel in the watermark tile and each area in the output image corresponds to one pixel in the watermark tile. The index value calculated for each pixel in the watermark tile is assigned to the corresponding area in the output image. Figure 5 shows the areas in output image 31 in additional detail. In Figure 5, the areas are referenced using a conventional matrix notation. For example area 4A is designated as area 1,1, area 4B is designated area 1,2 etc. The starting index value for each area is the index value for the corresponding pixel in the watermark tile. The starting index value for each area is given by the number in bold type in Figure 5.*

APPENDIX A
09/553,112, filed 4/20/00

*The characteristics of the lines in the output must be chosen as indicated by block 23 in Figure 2. For purposes simplicity, the example described here utilizes lines that are straight with a weight of four pixels. However, depending upon the artistic effect desired, lines with a wide range of characteristics can be chosen. For example lines that have waves at selected frequencies can be used. Dotted lines can be used. Very thin lines or very heavy lines can be used. Lines that are tapered in width can be used. The above are merely a few examples of the types of lines that can be used to achieve desired artistic effects. However, for ease of illustration in the example explained here straight lines with a weight of four pixels are used.*

Figure 4:
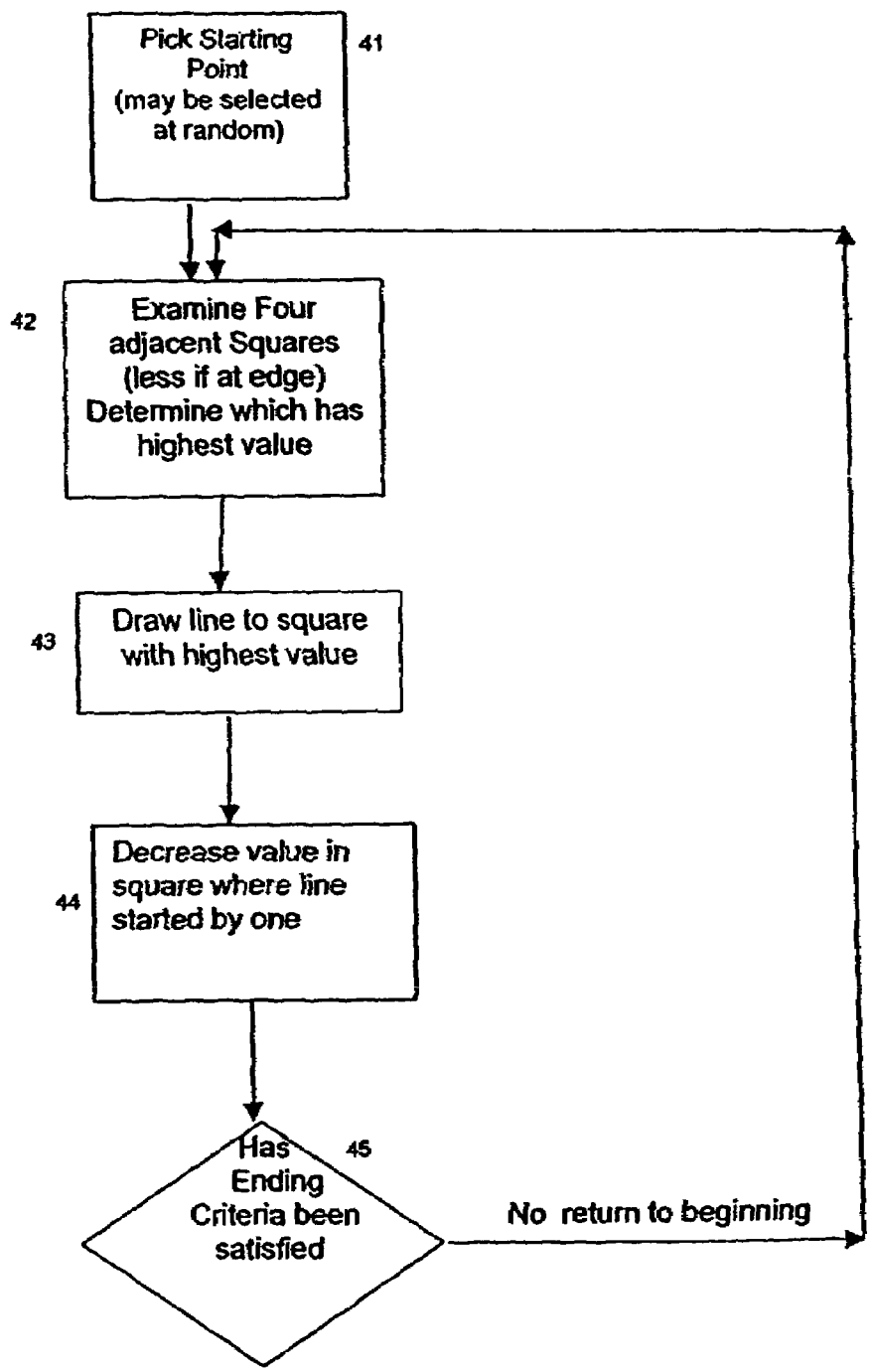
FIG. 4 is a flow diagram of an embodiment according to the present invention.

*Lines are drawn in the output image using the algorithm shown in Figure 4. First, a starting point is picked as indicated by block 44. For purposes of the example described here area 1,1 is chosen as the starting point. It is however, noted that the location of the starting point can be chosen arbitrarily. Next as indicated by block 42, the index values of the area adjacent to the starting area are examined and the area with the highest index value is selected. In the present example, there are only two adjacent area, namely areas 1,2 and 2,1. Area 1,2 has an index value of 5 and area 2,1 has an index value of 2. A line is drawn from the starting area to the adjacent area with the highest index value as indicated by block 43. In this case area 1,2 is the adjacent area with the highest index value. The starting location of the line can be chosen randomly. For simplicity in the present embodiment lines are drawn only horizontally or vertically; however, in alternative embodiments lines can be drawn at angles selected randomly or according to any desired pattern. The length of the lines can be chosen randomly so long as a line begins and ends in the designated area.*

*After a line is drawn from one square to another square, the index value of the square where the line started is decreased by one as indicated by block 45. This is shown in Figure 5 by the numbers in parenthesis. Hence for the line described above, the index value for area 1,1 is reduced from 4 to 3. The process then repeats. Area 1,3 is the area adjacent to area 1,2 that has the high index value (excluding the area where the line to area 1,2 originated). A line is therefore drawn from area 1,2 to area 1,3 and the index value of area 1,2 is reduced from 5 to 4. Following the same algorithm a line is next drawn to area 2,3 and then a line is drawn to area 3,2.*

*The process can continues until all areas have an index of zero. However, it has been found that the process can be stopped after the number of lines drawn equals the number of squares. Other criteria can be used to determine when to stop the process. Basically, by trial and error one can determine when a watermark with sufficient intensity has been embedded in the image or when the desired artistic effect has been achieved. If prior to the time one cares to terminate the process, one arrives at a point where all the*

APPENDIX A
09/553,112, filed 4/20/00

*adjacent areas have an index value of zero, one can merely restart the process from an arbitrary location. Likewise if one arrives at a point where all the adjacent area have the same index value, one can arbitrarily choose where to draw a line.*

Figure 6:
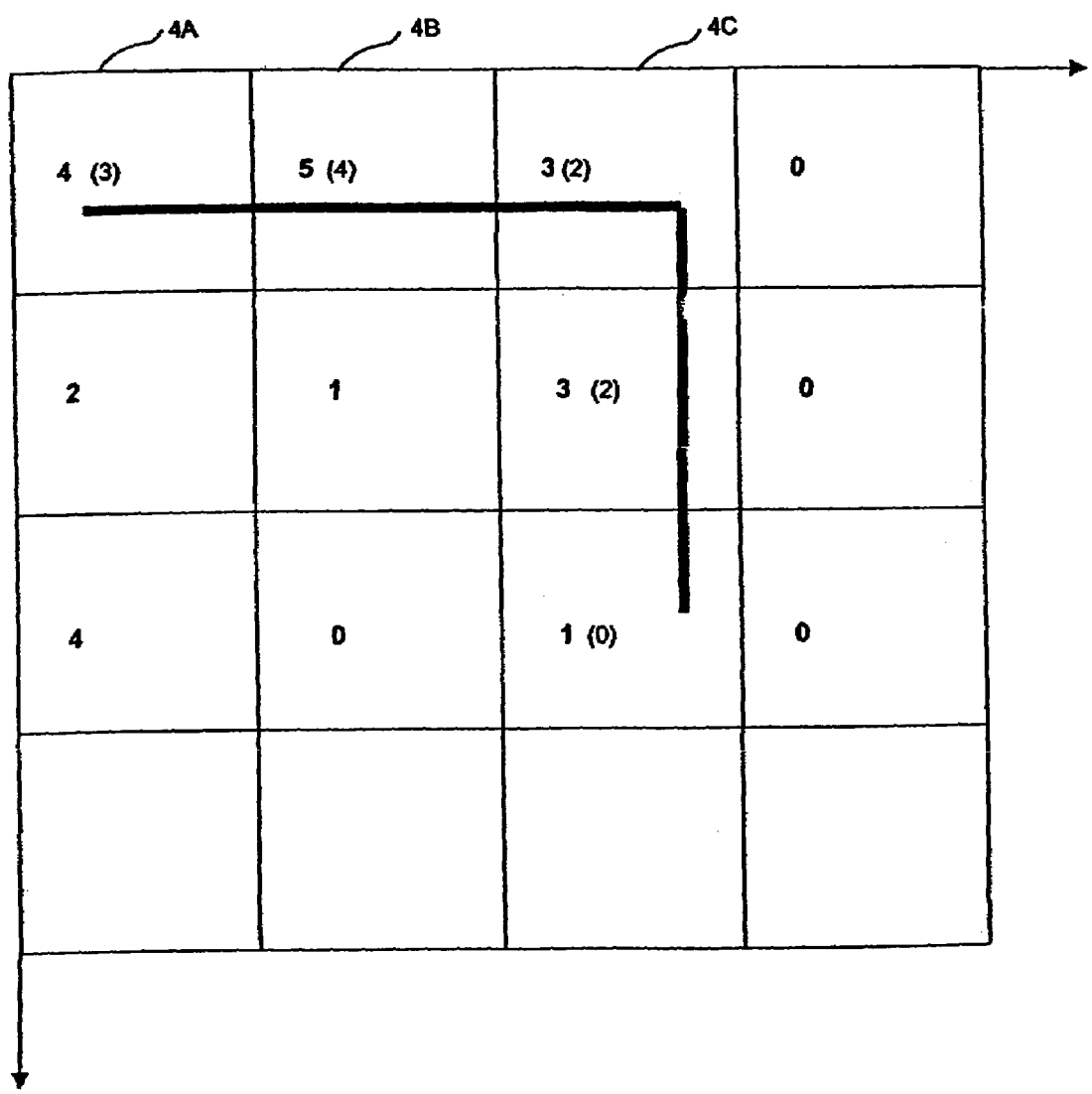
FIG. 6 shows an alternative arrangement of lines in an output image.
Figure 7:
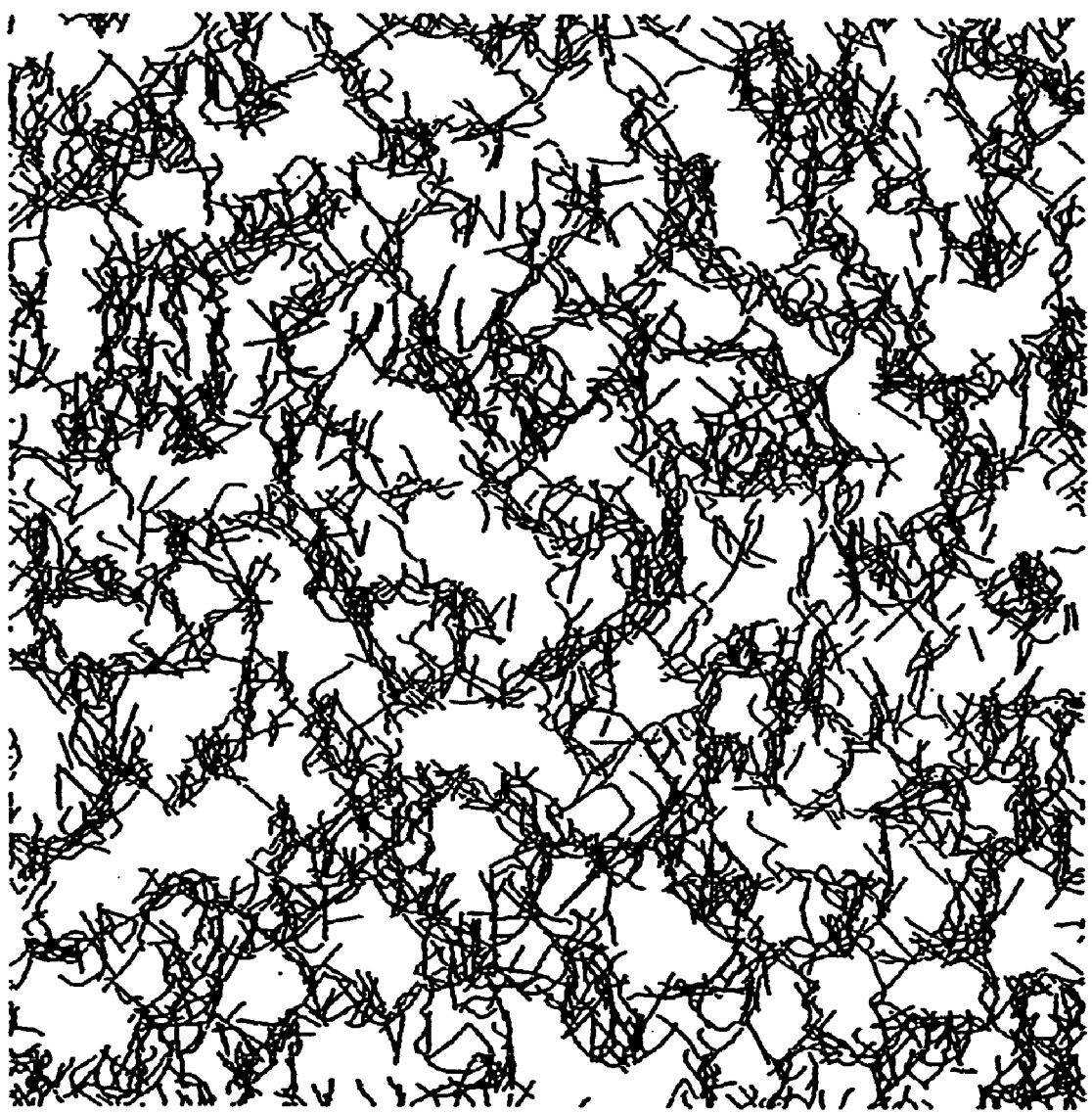
FIG. 7 is an overall diagram of an output image.

*In the embodiment shown, the lines begin at random locations. Figure 6 shows an example where each line begins from the terminal point of the previous line. Again here the length of the lines is chosen randomly.*

*In the embodiment shown above, lines are drawn between area in the output image. It is noted that artifacts other than lines could be used. For example, instead of lines, one could use circles, or stars, or small images of birds. In fact one can use any artifact that would create a change in luminance which could be detected by a watermark reading program.*

*Conventional watermarking program redundantly encode the watermark data in an image. This increases reliability and robustness of the watermark. Likewise with the present invention, a pattern could be repeated in an output image. The repeated pattern could be the same pattern or it could be a different pattern carrying the same watermark. That is, one could have multiple identical patterns in an output image. Alternatively, one could have multiple pattern which differ from each other but which carry the same watermark payload data. For example, different patterns can be generated by merely starting the process at a different location in the image. Alternatively, one could have different patterns using different types of lines, or for example patterns where the starting are for the line drawing algorithm was at a different area in the output image. The size of the areas or bumps in the output image have the same affect as do the size of the areas or bumps in an image modified by a conventional watermarking program.*

*While the invention has been shown and described with respect to preferred embodiments thereof, it should be understood that various changes in forma and detail can be made without departing from the spirit and scope of the invention.*

APPENDIX A
09/553,112, filed 4/20/00

APPENDIX B

METHODS AND SYSTEMS FOR DIGITAL WATERMARKING

Related Application Data

The present application is related to copending applications 09/127,502, filed July 31, 1998; 09/074,034, filed May 6, 1998; 09/234,780, filed 1/20/99; 09/433,104, filed November 3, 1999; 09/503,881, filed February 14, 2000; and application \_\_\_\_\_, filed April 20, 2000, entitled Image Patterns that Constitute Digital Watermarks.

The present application is also related to applications entitled Digital Watermarking of Physical Objects, and Digital Watermarking Systems, both filed herewith.

The present application is also related to the assignee's patents 5,862,260, 5,850,481 and 5,841,886.

Field of the Invention

The present invention relates to processing of physical media (e.g., blank printing stock, product packaging, catalogs, advertisements, etc.) to impart a machine-readable indicia (e.g., a plural-bit digital watermark) thereto.

Background and Summary of the Invention

Digital watermarking technology, a form of steganography, encompasses a great variety of techniques by which plural bits of digital data are hidden in some other object without leaving human-apparent evidence of alteration.

Most commonly, digital watermarking is applied to digital objects, such as digital image, video, and audio. In the case of images, slight changes can be made to local luminance or color values to effect the encoding. These changes can later be detected by a computer, and analyzed to discern the watermark information represented thereby.

Digital watermarking techniques can also be applied to traditional physical objects, including blank paper. Such blank media, however, presents certain challenges since there is no image that can serve as the carrier for the watermark signal.

The assignee's U.S. Patent 5,850,481 notes that the surface of a paper or other physical object can be textured with a pattern of micro-indentations to steganographically encode plural-bit information. The texturing is optically discernible, e.g., by a scanner, permitting the digital data to be decoded from scan data corresponding to the paper object.

In application 09/127,502, the present assignee taught various other arrangements by which blank media can be processed to encode a digital watermark. Some techniques employ very subtle printing, e.g., of fine lines or dots, which has the effect slightly tinting the media (e.g., a white media can be given a lightish-green cast). To the human observer the tinting appears uniform. Computer analysis of scan data from the media, however, reveals slight localized changes, permitting the multi-bit watermark payload to be discerned. Such printing can be by ink jet, dry offset, wet offset, xerography, etc.

Other techniques disclosed in the '502 application extend the texturing techniques first set forth in the '481 patent, e.g., by employing an intaglio press to texture the media as part of the printing process (either without ink, or with clear ink).

In accordance with certain embodiments of the present invention, machine-readable indicia (e.g., watermarks) are printed on, or in, media using inks having infrared or ultraviolet spectral characteristics, facilitating machine detection without compromising human invisibility. Still other embodiments employ inks that are chosen with regard to spectral illumination that may be expected from CRT displays in whose presence certain indicia may be sensed. A great many other embodiments and features are also disclosed.

*Detailed Description*

In accordance with certain embodiments of the present invention, machine readable indicia can be printed on or in media (e.g., security documents, identification documents, etc.) using inks having infrared or ultraviolet spectral characteristics. A watermark printed with infrared-responsive ink, for example, may be sensed by many CCD detectors. (The spectral responses of many conventional CCD detectors extend somewhat into the infrared spectrum; the response at other wavelengths can be reduced by employing a suitable IR-passing filter layer between the CCD and object.) To the extent the ink's reflectance spectrum extends beyond the range viewable by humans, correspondingly more watermark energy may be encoded into the medium without regard to potentially objectionable human visible artifacts. Inks that are essentially transparent to visible light (i.e., essentially not visible) can be used to print machine-readable indicia on substrates without regard to subtleness or clever hiding tricks. They can form blatant patterns in the IR or UV spectrum, obviating the need for difficult signal-processing tricks to extract a weak data signal from a large noise signal. Watermark patterning, such as described below (e.g., binary checkerboards), can be used. So too with bar codes and other machine readable patterns.

The ink can be applied by any technique, including inkjet printing, wet-or dry-offfset, gravure, intaglio, etc. Moreover, the ink can be applied inside the media, or outside. In the former case, the media is formed in a process that introduces that permits marking of an interior portion. One such method is opacification of a translucent polymer film with several layers of ink or the like. Another is laminate construction. Such techniques, and the use of watermarking therein, are more particularly detailed in the application filed herewith entitled Digital Watermarking of Physical Objects, cited above Marking outside the medium can be accomplished before other printing (e.g., while blank), as part of a printing process (e.g., intaglio application of inked line art to a banknote), or as an overprint after the visible printing design is formed. Such marking may be coextensive with the media, or may be limited to

*certain portions (e.g., areas that are otherwise blank, or – in an identity document – the bearer's photograph, etc.).*

*In accordance with another embodiment, each cash receptacle in a cash register drawer or the like is equipped with a small IR illumination source (e.g., LED), together with a 1-D or 2D sensor having sensitivity extending into the IR. The sensor, together with associated control and processor circuitry, can image and analyze a pattern taken from the top banknote placed in the receptacle to confirm that the detected pattern corresponds to that of an authentic banknote. A counterfeit note, produced e.g., with a conventional ink jet printer, will not have the telltale IR patterning, and can be flagged as illegitimate.*

*Such a sensor apparatus may also be fashioned as a stand-alone station for use at point of sale stations. Using such an apparatus, a cashier can check banknotes received from customers to confirm their authenticity.*

*A similar such device may "read" the denomination of a banknote from a watermark sensed by such a point-of-sale station or cash drawer. Any return change to be provided to the consumer can be calculated by an electronic terminal, without human data entry or opportunity for error.*

*Magnetic inks can likewise be used to boost machine detectability, providing a digital watermark signal that is less humanly-sensible than ordinary inks.*

*Two inks can be fashioned to have the same appearance to humans, but one have a spectrum that extends outside the visible spectrum (e.g., IR or UV). A substrate may be printed with one or more patterns that are printed partially with one ink and partially with the other. When sensed at IR or UV, parts of the pattern(s) disappear. Again, the inability of commonly available printing systems to print with such specialized inks provides a barrier to effective counterfeiting.*

*In applications 09/234,780 and 09/433,104, the present assignee disclosed systems in which two watermarks of different character are embedded in an object. The watermarks are designed to degrade differently in the presence of corruption, distortion, etc. In some embodiments, a "frailer" of the two watermarks may disappear when the encoded object undergoes any lossy manipulation.*

*Such an arrangement can similarly be effected by encoding two watermarks in a printed object, one of which watermarks is printed with an ink having characteristics not readily mimicable by conventional color printers (i.e., those based on cyan, magenta, yellow, and black colors). UV or IR spectral response is one such characteristic. Magnetic ink is another. A reproduction made with a conventional color printer will be missing one of the two watermarks, permitting an original to be distinguished from a copy.*

*Still other substrate markings can include combinations of visible and invisible (i.e., IR, UV, magnetic) markings.*

*In the present assignee's MediaBridge technology (detailed in applications 09/547,664, filed April 12, 2000, and ), watermarked objects (e.g., magazine ads) held in front of an optical sensor (e.g., a camera) cause a coupled computer to link to an internet site associated with a code watermarked into the* object. Many such cameras are adapted for mounting on top of, or near, a user's CRT monitor. The object held in front of the sensor may thus be illuminated – in whole or in part – by radiation from the phosphors of the CRT screen. Such phosphors have well defined spectral emissions (Fig. 1 is exemplary for monitors employing sulphide phosphors), and can serve as powerful illumination sources within certain spectral bands. According to yet another aspect of the present invention, the spectral radiation from a CRT is quantified, and the ink used to watermark an object is selected in accordance with such spectrum. Thus, for example, if a CRT produces a local maxima of spectral energy at a wavelength of 525 nanometers, and a local minima at 500 nanometers, use of an ink that reflects light of 525 nanometers would be advantageous. In contrast, if the ink reflects light at 500 nanometers, such effect would contribute little to watermark detectability but would instead serve only to make the watermark more visible to human observers. By using inks optimized to respond to the particular illumination expected from a monitor (or other predictable illumination source), machine detection of a watermark may be increased without increasing (but rather more generally decreasing) human visibility of the mark.

The same principles are equally applicable with other machine readable indicia – not just watermarks, but also bar codes, data glyphs, etc.

Since most color CRTs employ three color phosphors, a great variety of optimizations are possible.

One optimization is to drive the CRT with video signals causing the encoded object to be illuminated with light of known character. For example, the video driver signals may flash a frame of solid-red illumination (or just the red component of the frame otherwise being displayed) at a known instant of its operation. A watermark detection circuit, coupled to the video circuitry or triggered through a common control system, can sample an object presented before the CRT at that instant and have a priori knowledge of the light spectrum illuminating the object. In some embodiments, the optical sensor may be a narrow-band sensor (e.g., including an optical filter) and thus be sensitive only, e.g., to red illumination. By such arrangement, higher signal to noise ratios may be achieved in decoding, with less chance of false decoding.

In accordance with still another embodiment of the present invention, a 1- or 2-D a barcode is encoded with a watermark. The watermark may be formed of UV, IR, or magnetic ink, as detailed above. But it may also be formed of the same ink as the barcode. It is possible to apply the watermark to a barcode such that the barcode is still readable, yet became a carrier for the watermark. Such a watermark may be applied by overprinting the barcode with speckles of ink, slightly changing the local contrast. Or the markings (e.g., lines) comprising the barcode can be slightly changed – in position or width – to effect the necessary luminance pattern of a desired watermark. (The slight changing of line placement or width to encode a watermark is more particularly detailed in application 09/074,034.)

The encoding of a barcode with a watermark can serve various purposes. One is as a hash code to confirm the validity of the barcode. Or the watermark may convey the same information as the barcode.

APPENDIX B
09/562,516, filed 5/1/00

*Or the watermark may encode, or correspond in a predetermined manner, with other information on the object so-marked. (For example, in an identity document, the watermark may encode the bearer's name, or the document serial number. Or a hash of the serial number. Etc. Such arrangements are further discussed in patent 5,841,886.)*

*In some identity document (e.g., passport) embodiments, by either texturing, or adding holographic like features to a laminate, the laminate itself can become the carrier for the watermark. This can be with visible, retro-reflective, or UV/IR structures. Since document readers are able to process these covert features, images of the marked area would be available to the document inspector while being more obscured from the document holder (and potential forger / counterfeiter). (Laminate-marking and UV/IR technology is further discussed in the patents and applications cited above.)*

*According to yet another embodiment of the present application, a ghost image can be constructed, using line structures or special raster patterns, to reproduce a photo in an identity document. Such structure typically appears next to the bearer's photo in an identity document and serves as a potential carrier of a digital watermark. One benefit to this arrangement is that it is a personalized structure, so it is created as part of the document personalization process -- a perfect time to add a watermark. A watermark can also be encoded in a latent image that is designed to appear only under certain lighting or sampling conditions.*

*According to still another embodiment of the present invention, an object (either a physical object or a data object, such as audio, image, video) is encoded with multiple watermarks. One identifies a master document series / source or printing, and another identifies a subgroup (e.g., a particular person or group of objects). These two markings can work together or separately to enhance authentication and owner verification.*

*Still other embodiments comprise plastic card-based identity documents. A digital watermark can be applied to the front or the back, and to the plastic card "substrate" or to a photo.*

*A great variety of substrate marking techniques are known in the present assignee's patents and applications identified below. These techniques are likewise useful in connection with identity documents.*

*In the foregoing embodiments, the watermark signal can be represented as a checkerboard pattern comprising, e.g., a 96 x 96 array of elements, where each element is 0.012 inch on a side. Each component element can be light or dark, or intermediate grey-scale values may be used to further reduce visibility. Such checkerboards may be tiled together to span the full width and length of the media.*

*Alternatively, patterns other than checkerboards can be used. Such patterns (e.g., weave-like patterns), and methods for their generation, are detailed in the '005 and '502 applications cited above.*

*In most embodiments, the watermark payload is uniform across the medium. In some applications, however, it may be desirable to encode different payloads in different regions of a medium.*

APPENDIX B
09/562,516, filed 5/1/00

*In other arrangements, the same watermark may be encoded in different places (e.g., on different sheets of media), but not by using the same pattern. Instead, different patterns can be used in different places to encode the same watermark payload.*

*The watermark can convey a payload of arbitrary length, commonly in the 2-256 bit range, perhaps most commonly between 24 and 72 bits. Error correcting coding, such as convolutional coding or BCH coding, can be employed to transform the base payload (e.g., 50 bits) to a longer data string (e.g., 96 – 1024 bits), assuring robustness in detection notwithstanding some data corruption (e.g., due to wear and tear of the medium, artifacts from scanning, etc.). The bits of this longer string are mapped, e.g., pseudo-randomly, to define the pattern (e.g., checkerboard).*

*An illustrative watermark-encoding technique is more particularly detailed in application 09/503,881, cited above (but is used without gain control and perceptual analysis since no image is present on the blank medium).*

*While the watermarking technique detailed in the just-cited application is preferred by the present assignee, it should be understood that the principles of the present invention can be employed with essentially any other watermarking technology. A great variety of such techniques are known.*

*Moreover, the invention finds application beyond "watermarking." Any form of machine-readable indicia, including 1- and 2-D barcodes and data glyphs, may be formed as noted above, and serve to facilitate machine-recognition of the media.*

*To provide a comprehensive disclosure without unduly lengthening this specification, the above-detailed patents and applications are incorporated herein by reference.*

*Having described and illustrated the principles of our invention with reference to specific embodiments, it will be recognized that the principles thereof can be implemented in other, different, forms.*

*For example, while one of the detailed embodiments contemplated changing the illumination provided by a monitor to optimize data detection, a filter can likewise be applied over the detector to eliminate wavelengths of unwanted light. In some sophisticated embodiments, the filtering can be electronically controlled, e.g., through use of known twisted nematic and other light shutter/filter technology.*

*The particular combinations of elements and features in the above-detailed embodiments are exemplary only; the interchanging and substitution of these teachings with other teachings in this and the incorporated-by-reference patents/applications are also contemplated.*

*In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.*

APPENDIX B
09/562,516, filed 5/1/00

APPENDIX C

Print Media with Embedded Messages for Controlling Printing

Related Application Data

The subject matter of the present application is related to that disclosed in US Patent 5,862,260, and in co-pending application 09/503,881, filed February 14, 2000; which are hereby incorporated by reference.

Technical Field

The invention relates to printer systems, and specifically, relates to adapting printer performance for different types of print media.

Background and Summary

A challenge facing printer manufacturers is developing cost effective ways to optimize printer operation for a variety of different types of paper. The myriad of paper types available today can exhibit widely varying performance in a printer. For example, in the field of ink jet printing, the absorption properties of different types of paper can significantly impact print quality. If the printer could ascertain characteristics of the paper, it could adapt its operation to the absorption properties of the paper and provide a higher quality printing across a variety of paper types.

One way to optimize printer performance for a variety of paper types is to make the printer operating parameters adaptable to a range of paper types. This leads to another challenge of properly setting the operating parameters for a particular print job. One way to set the parameters is to provide a user interface that enables the user to input paper type or paper characteristics. This, of course, is quite demanding on the user.

Another alternative is to automate parameter adjustment by incorporating technology into a printer to enable it to determine paper type automatically and adapt its operation accordingly. For example, developers of ink jet printing technology have attempted to design sensors to determine paper type so that printer operation can be optimized for the paper. Ideally, the printer should be able to detect paper characteristics such as its thickness, reflectivity, dimensions, absorption coefficient, and bleeding coefficient. While such sensor technology holds promise in improving print quality, building such sophisticated sensor technology is complex and costly.

The invention provides technology for determining print media attributes and adjusting printer parameters using control data embedded in the print media. In particular, a message embedded in the printer paper conveys printer control information to the printer about paper characteristics. A printer, or other system with printing capability (e.g., fax machine, scanner, copier, etc.) uses a sensor to capture a representation of the message signal and automatically decodes printer control information from the message signal. A control unit in the printer interprets this information and uses it to adjust operation of the printer.

There are several aspects to the invention. One aspect of the invention is a paper medium carrying a steganographic message used to adapt printer operation to the paper medium. The steganographic message includes printer control information related to the paper medium that is readable by a machine. This information is used to control a printer so as to optimize print quality for the paper medium.

Another aspect of the invention is a printer system that adapts the operation of a printer to print media based on control information embedded in the print media. The system comprising an image sensor for capturing an image of print media, a steganographic decoder for reading a steganographic message from the image of the print media, and a printer control unit in communication with the decoder. The printer control unit receives the printer control information and uses the information to optimize printer operation for the print media.

Another aspect of the invention is a method for adapting operation of a printer to a type of print media. The method captures an image of at least a portion of a print media, steganographically decodes a message from the image, including printer control information, and uses the printer control information to adapt operation of the printer to the type of print media.

Further features will become apparent with reference to the following detailed description and accompanying drawings.

*Detailed Description*

The following sections describe methods and systems for using digital watermarks on print media to convey printer control information to a printer. This printer control information may be expressed in many forms. It encompasses paper characteristics and printer control parameters. One form of printer control information is an identifier or set of identifiers that index control information. The printer uses the identifiers to look up corresponding printer operating parameters.

Another form of control information is a set of paper characteristics, such as paper thickness, reflectivity, dimensions, absorption coefficients, bleeding coefficients, etc. Still another form of control information is one or more printer control parameters that control printer operating settings. In an ink jet printer, these settings may include the volume of ink drops, the number of ink drops emitted per unit area, etc. It may also include rendering of the image at the optimum resolution (e.g., dpi) determined by the control information embedded in the paper.

Figure 8:
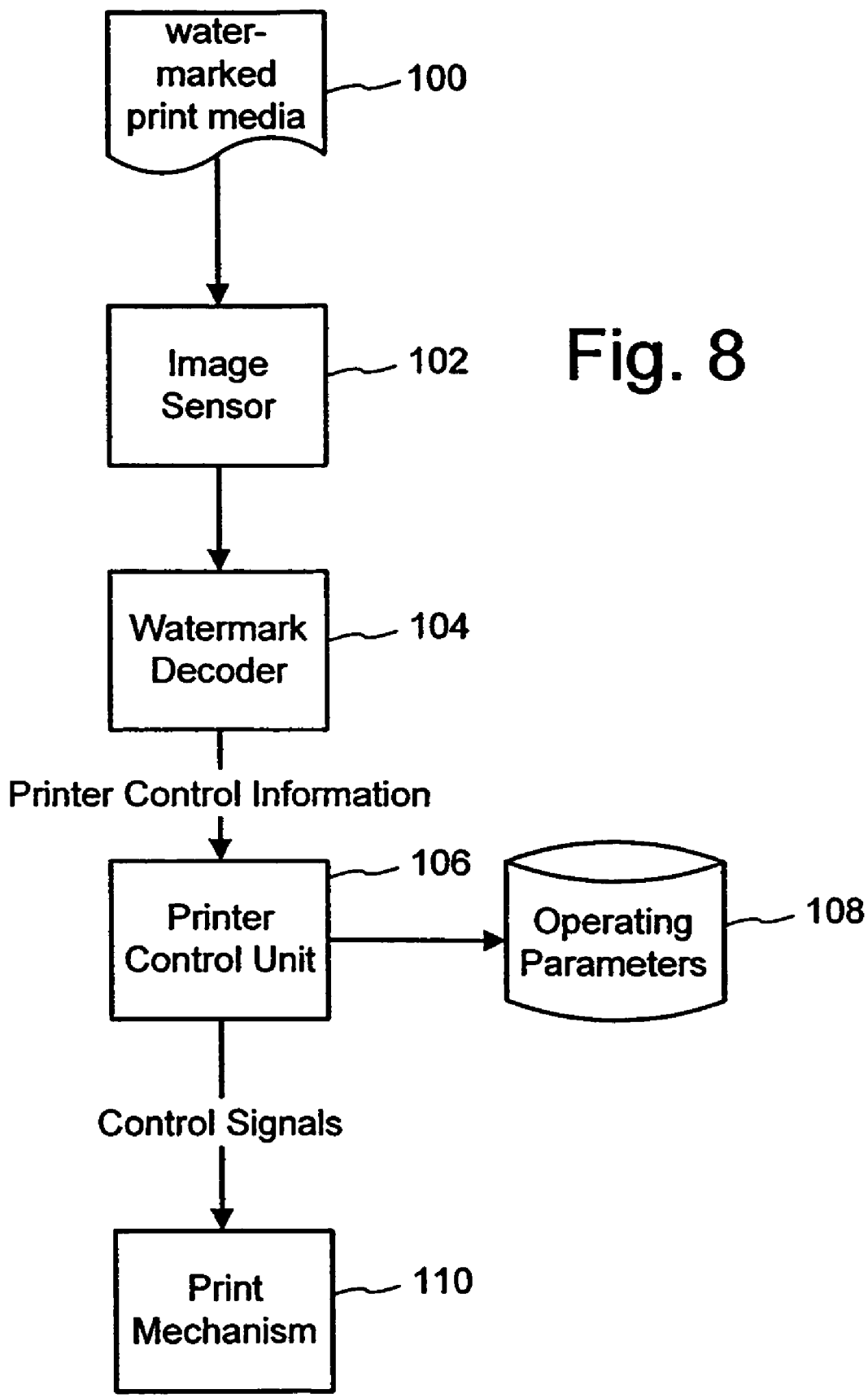
FIG. 8 is a block diagram illustrating a printer architecture that reads digital watermarks to obtain printer control information.

Fig. 8 is a block diagram illustrating a printer architecture that reads digital watermarks to obtain printer control information. The watermarked print media 100 shown in Fig. 8 represents a sheet of paper or other object submitted to the printer. The print media includes a digital watermark that conveys printer control information. A variety of digital watermarking schemes may be used to embed the APPENDIX C
09/619,264, filed 7/19/00 watermark onto the print media. Some example watermark encoding and decoding schemes are provided in US Patent 5,862,260, and in co-pending application 09/503,881, filed February 14, 2000.

In digital watermarking of physical objects, there is a tradeoff between visual perceptibility and survivability of the watermark. In this application, the watermark is embedded so as to be sufficiently robust to survive analog to digital conversion. The watermark may be encoded by altering the luminance or one or more other color channels of an image on the surface of the paper. Alternatively, the watermark may be encoded using clear inks that modulate the microtopology of the paper's surface or that are readable when exposed to light in non-visible wavelengths, like UV or infrared. Also, the microtopology of the paper surface may be altered in the process of creating the paper so as to embed a watermark. Alternative machine readable codes may be used as well, such as data glyphs, bar codes, etc.

The watermark signal is preferably repeated on the surface of the print media so that a watermark decoder can extract the printer control information from a small and relatively arbitrary portion of the print media. For example, the watermark signal may be repeated across one side or both sides of a piece of paper. If the watermark is slightly visible like a conventional watermark, it may be preferable to place it only on one side of the paper so as not to interfere with content printed on the other side.

In the system depicted in Fig. 8, the printer architecture has an image sensor 102 to capture an image of the watermarked print media. As discussed below, the image sensor may be an integrated component of a product with a printer subsystem or a separate component of a computer system attached to a printer. The image sensor transfers the image to a memory device. Depending on the implementation, this transfer may encompass one or more intermediate stages where portions of the image are temporarily buffered, transformed (e.g., color conversion), compressed, uncompressed.

A watermark decoder 104 reads watermarked image data from the memory device, detects the watermark in the watermarked image and extracts a message from the watermark, including any printer control information. The decoder communicates the printer control information to a printer control unit 106, which in turn, interprets the control information and determines the corresponding operating parameters 108 to apply to a print job for the print media.

The printer control unit 106 enforces these operating parameters by issuing corresponding control signals to a print mechanism 110.

The image sensor, watermark decoder and printer control may be implemented in a variety of combinations of hardware, firmware and software.

The image sensor may be implemented using conventional imaging devices such as CCD or CMOS arrays used in scanners and cameras. The sensor may be built into the printer, or may be a peripheral device, such as a PC camera. In the former case, the image sensor within the printer communicates image data to the watermark decoder. Many printers are subsystems of multifunction devices that have printing and scanning functions. For example, copiers and fax machines have printers, APPENDIX C
09/619,264, filed 7/19/00

*image sensors, and memory for storing an images or portions of an image. In these types of devices, the watermark decoder operates on portions of the image as it is scanned into the device's image memory.*

*In the latter case, the image sensor may communicate the watermarked image directly to an image memory and watermark decoder within the printer. Alternatively, the image sensor may communicate the image to image memory in a computer, which in turn, either executes a software watermark decoder on the image, or transfers the image to a watermark decoder in the printer. For example, a printer driver executing on a PC attached to the printer may include a watermark decoder to extract printer control information. In this configuration, a user would present the paper to a camera, such as a PC camera, attached to the computer. The printer driver then would access image data in the computer's memory captured from the camera and execute watermark detecting and reading on that image data. The printer driver then either communicates extracted printer control information to the printer, or interprets it on the PC and issues control signals to the printer.*

*As demonstrated in the examples provided above, the watermark decoder may be implemented within a printer or in a separate device that communicates the printer control information or control signals to the printer. For example, the watermark decoder may be an application program (e.g., the printer driver program) in a computer attached to a printer, or a program implemented in software or firmware in the printer. Alternatively, the watermark decoder may be implemented in hardware within the printer or some other device connected to it, such as a camera, Personal Computer, personal digital assistant, etc.*

*The printer control unit may be implemented within the printer, a device connected to the printer, or in a combination of both. For example, the control unit may be a programmed processor, such as a DSP, in the printer, a printer driver in a computer attached to the printer, or in a combination of both.*

*To illustrate the operation of the system, consider an example of a multifunction device that includes an ink jet printer and scanner. The user places blank watermarked paper in the printer and sends a print job to the printer from an attached computer. As the printer loads a sheet of paper to start the print job, it scans an image of at least a portion of it (e.g., the top edge). When sufficient image data fills a buffer in the scanning subsystem, it sends a signal to the watermark decoder, executing within a processing unit on the device. The amount of image data needed to trigger watermark decoding depends in part on the embedding process, and specifically, on the minimum image size required to hold a complete watermark message. For example, if the watermark is repeated in lines or blocks of the paper surface, the image sensor needs to capture an image of at least one line or block.*

*Operating on the image data, the watermark decoder detects the watermark, reads the message from it, and transfers the printer control information in the message to the printer control unit.. The printer control unit uses the printer control information as an index in a table to look up corresponding operating parameters. These operating parameters are associated with control signals. The printer control unit issues these control signals to the print mechanism. The print mechanism includes a print*

APPENDIX C
09/619,264, filed 7/19/00

*head and cartridge that allows for the control of ink drops per a given dot location on the page. Based on the absorption properties of the paper, as conveyed in the watermark, the printer control unit sends a control signal to the printer cartridge that specifies the number of drops to be emitted per dot.*

*These functions of the printer control unit may be implemented within the same or separate processing unit as the one that executes the watermark decoder.*

*Concluding Remarks*

*Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.*

*The particular combinations of elements and features in the above-detailed embodiments are exemplary only; the interchanging and substitution of these teachings with other teachings in this and the incorporated-by-reference patents/applications are also contemplated.*

APPENDIX C
09/619,264, filed 7/19/00

APPENDIX D

LINKING FROM PAPER INVOICES AND STATEMENTS TO ON-LINE RESOURCES

Field of the Invention

The present invention relates to invoices, bank statements, and other account paperwork that is exchanged between parties in connection with commercial transactions, and more particularly relates to the integration of such paperwork with on-line systems.

Detailed Description

In application 09/571,422, filed May 15, 2000, the present assignee disclosed various arrangements for linking from physical objects (e.g., business cards, milk cartons, etc.), to associated on-line resources. The physical objects can be marked with steganographic digital watermarks (e.g., as detailed in application 09/503,881, filed February 14, 2000), or by other machine-readable indicia such as bar-codes, data glyphs, etc.

In accordance with the present invention, these same principles are applied to invoices, bank statements, and similar account paperwork.

More particularly, such paperwork includes indicia that encodes information corresponding to an on-line address. When the indicia is sensed by a corresponding sensor (e.g., a web cam), the address information is decoded, and a link is established between the user's computer and the corresponding on-line address. Most commonly, the encoded information is an identifier that is used to index a database record containing the on-line address. This address is then provided to an Internet browser on the user's computer, permitting a corresponding web page to be loaded. In other embodiments, the on-line address can be directly encoded in the indicia.

In the case of a utility bill or the like, a consumer shows the bill to the web cam. (The bill can be held in front of the camera, or the camera can be held over the bill.) Browser software on the consumer's computer responds an instant later with a web page customized to that user, including an electronic version of the bill. A user interface included on the web page permits the consumer to authorize electronic payment of some or all of the amount due, either by credit card, electronic funds transfer from a bank account, or otherwise. Account review (both current and historical), customer service, and related services can also be provided via the web page. The web page may also include third party targeted advertising, as well as promotional information provided by the billing company (e.g., a cable company may use such web sites to inform customers of upcoming events, a telephone company may use the sites to promote special offers, etc.)

In addition to on-line payment, such a web page may provide for printing of a corresponding paper check at the user's computer – with the payee, amount, and date fields filled in automatically so as to APPENDIX D
09/631,409, filed August 3, 2000

*prevent transcription errors. This functionality may be provided by a linkage between the web data and check-writing features of programs such as Microsoft Money or Quicken. Or the web page can include an embedded aplet that directly prints a corresponding check from the user's computer, etc. Regardless of payment technique, the system can update the user's corresponding account information accordingly (e.g., entering an electronic payment in an on-line check register).*

*Such an arrangement offers the best of the print and electronic worlds. For the customer, it reduces the time to pay bills, and avoids the time and expense associated with writing and mailing checks. Payments can be controlled by the customer to meet their particular needs (e.g., scheduling of payments, making partial payments). The system is simple – just show the paper invoice to the computer. And the system is failsafe, in that if the electronic network goes down, the user can write a check based on the paper invoice, as always.*

*For the billing business, the system reduces administration costs by reducing physical mail and check processing, while providing enhances customer service. And the provision of targeted advertising provides a further revenue opportunity.*
*and provides enhanced customer service.*

*Much the same arrangement can be used with bank statements - for checking accounts and the like. The paper statement mailed to the customer is digitally watermarked, permitting an on-line version of the statement to be accessed simply by showing the paper to a web cam. Customary on-line banking tools can be included at the web site, including interfaces with common on-line banking software such as Microsoft Money and Quicken. (Indeed, the watermark reader may be included as an element of such software, or as an auxiliary utility that cooperates with the on-line banking software.)*

*Likewise, checks can be digitally watermarked – both checks printed by commercial check printers, and checks printed on home computers using various home banking software. The watermark can uniquely identify the check. When such a check is presented to a webcam, associated software can link to a database to obtain, and display, information relating to the check. The database can be on a remote computer (e.g., the bank's computer), or can be local (e.g., a check register maintained on by a home computer software application, such as Microsoft Money, or Quicken).*

*In all such approaches, a generally increased level of security is inherent, since the system relies on custody of the physical invoice or bank statement to gain access to the web page – a circumstance that imposters will find difficult to imitate. This circumstance notwithstanding, the web page may also include password protection or other security measures to guard against unauthorized access, e.g., from discarded account paperwork. (Account paperwork older than a set threshold, e.g., 45 days, may be disabled from access, if desired, to help protect against unauthorized use.)*

*To provide a comprehensive disclosure without unduly lengthening this specification, applicant incorporates by reference the patent applications cited above.*

*Having described and illustrated the principles of my invention with reference to specific*

APPENDIX D
09/631,409, filed August 3, 2000 embodiments, it will be recognized that the principles thereof can be implemented in many other, different, forms.

For example, while the detailed description contemplated use in conjunction with a web cam and personal computer, a great variety of other platforms can also be employed. These include set top boxes, smart phones, palm computers and organizers, etc. – any of which can provide Internet linking.

Likewise, while the detailed description particularly contemplated use of digital watermark technology, some of the same advantages can be achieved through use of other machine readable indicia, including bar codes, data glyphs, etc.

Moreover, the particular combinations of elements and features in the above-detailed embodiments are exemplary only; the interchanging and substitution of these teachings with teachings in the incorporated-by-reference applications are also contemplated.

In view of the wide variety of embodiments to which the principles and features discussed above can be applied, it should be apparent that the detailed embodiments are illustrative only and should not be taken as limiting the scope of the invention. Rather, I claim as my invention all such modifications as may come within the scope and spirit of the following claims and equivalents thereof.

APPENDIX D
09/631,409, filed August 3, 2000

APPENDIX E

PRINTING MEDIA AND METHODS EMPLOYING DIGITAL WATERMARKS

Field of the Invention

The present invention relates to use of digital watermark technology in conjunction with envelopes and other documents.

Background and Summary of the Invention

Computer printers have long been used to print addresses on envelopes. With the advent of digital postage, use of printers with envelopes is increasing still further.

Digital postage technology is available from a number of vendors including Pitney Bowes, E-Stamp, Stamps.com and Escher Laboratories (of Escher Group, Ltd.), and is detailed in various patent publications including 5,982,506, 5,825,893, 5,819,240, 5,801,364, 5,774,886, 5,682,318, 5,978,781, and WO 99/18543A1.

Digital watermarking technology is used, in accordance with certain embodiments of the present invention, to increase the security of, and augment the functionality associated with, computer printing of envelopes and postage.

In accordance with one aspect of the invention, traceability of digital postage is enhanced by serialization, i.e., embedding a serial number code or other indicia that uniquely and covertly links the printed postage to some device or software in the users' possession, or that identifies the user. This device can be a printer, personal computer, or hardware security device used in printing the postage. In an exemplary embodiment, digital watermarking of the sort detailed in the cited patents and applications is used to embed the code at the time the postage is printed. The embedded data would only be detectable to investigators equipped with special readers for spot checking documents or investigating counterfeits.

In accordance with another aspect of the invention, security of digital postage against reproduction is enhanced through use of "fragile" digital watermarks. (A "fragile" digital watermark is one designed, e.g., not to fully withstand the scanning/printing operations associated with photocopying or PC-based scanning and printing.) Such a watermark may be employed to provide forensic evidence that printed postage is not original.

In accordance with yet another aspect of the invention, watermark technology is employed to prevent – outright – the photocopying or other duplication of digital postage. This result is achieved by encoding on envelopes a "do not copy" watermark to which photocopiers, scanners, printers, and other computer devices are alert. If such a watermark is encountered, the device will refuse to operate, or will otherwise interfere with the reproduction operation.

APPENDIX E
09/689,289 filed October 11, 2000

*In accordance with still another aspect of the invention, watermarking on an envelope is employed as an element of a franking mark (postal mark) – one that may stay within or extend well beyond the corner location typically associated with such marks.*

*In accordance with yet another aspect of the invention, watermarking on an envelope can serve as a portal to a corresponding internet site or internet-based application. That is, a printed document with an embedded watermark can be held up to a web cam, or scanned by a scanner, and instantly link a user to Internet sites or applications. Importantly, information received in this manner is not subject to the delays associated with physical mail delivery, but can convey up-to-the-minute information.*

*In accordance with still another aspect of the invention, an envelope watermark serves to convey an identifier that is used to access associated data in a database. In one particular application, the index number identifies the recipient. Thus, for example, an envelope can be addressed simply by watermarking it with a unique recipient designator, e.g., JOHNQPUBLIC843. Processing equipment in the postal system can read the watermark, query a database with the designator, and determine thereby the recipient's physical address. (If desired, the address thereby discerned can be printed on the envelope.) One advantage to this arrangement is that distribution of Change of Address cards would be a thing of the past. If a person moves across country, a single record in the database is changed. All mail to that recipient automatically is directed to the new physical address.*

*In accordance with yet another embodiment, digital watermarks on envelopes can be applied by specialized printers (e.g., postal metering devices), or by using common office printers (e.g., laser, ink-jet). In such systems, the watermark embedder software may be integrated into the printing device, or can be resident on an associated computer system. The software is desirably secured against tampering using various anti-hacking techniques. The production of the digital watermark may not be optional (i.e., it may be applied without user control), and the payload can be tailored in accordance with the amount of postage, device/software/user information, or other application information. Such a system may also include an application that calibrates printing of the watermark to the user's specific printer or software, thus accommodating a wide range of usage scenarios. A hardware security device used, e.g., to store postage value (e.g., a digital vault) may also be employed by the watermark embedding system, e.g., as a source of secure and potentially unique data used in encoding the digital watermark.*

*In accordance with still further embodiments of the invention, the principles described herein are also applicable to other printed value documents (e.g., tickets and coupons), especially those that are printed on demand. Such documents may be printed at home, at special kiosks (e.g., in-store), or by commercial printing establishments (i.e., mass produced). Among other functionality, the watermarks in such value documents can be used by investigators to distinguish originals from reproductions (by use of fragile watermarks), to authenticate documents (e.g., in ticket reading machines), and to link to associated internet resources. The watermarks can also be linked to other information (e.g., event date, seat number, product code, etc.) textually printed on the document, or present on the document in some machine*

APPENDIX E
09/689,289 filed October 11, 2000

*readable form (e.g., barcodes). In such case, the watermark can be used to detect document alteration by checking for discrepancy between the watermark-encoded information, and that otherwise conveyed by the document.*

*In accordance with yet other embodiments of the invention, blank printing stock (e.g., other than envelopes) can be digitally watermarked to serve various ends. The watermarking continues to be detectable after the blank stock is thereafter printed.*

*The features just-described can be employed alone or in various combinations.*

*The foregoing and additional features and advantages of the present invention will be more readily apparent from the following detailed description.*

<u>Detailed Description</u>

*Digital watermarking technology, a form of steganography, encompasses a great variety of techniques by which plural bits of digital data are hidden in some other object without leaving human-apparent evidence of alteration or data representation.*

*Digital watermarking of envelopes can be effected in numerous ways, including by ink (clear, optically-opaque, IR/UV-opaque), by texturing, by laminate layers, etc. The watermarking can be formed as part of other markings on the envelope (e.g., franking marks, graphics, text, etc.), or can be applied irrespective of such other markings. Watermarking can be effected at any time in an envelope's life, including at the time of media-making (e.g., paper making or Tyvek formation), at the time of envelope making, at the time of consumer use (either before, during, or after the application of other envelope markings), and thereafter (e.g., in the course of postal service processing).*

*The watermarking may span all of one side (or both sides) of an envelope, or may be localized, e.g., in the areas typically associated with postage, return address, and recipient address. An envelope may convey a single watermark, or several may be used, e.g., conveying different information or serving different purposes in different regions. Several different watermarking technologies can be employed on a single envelope, e.g., the envelope's texture can convey one type of information, and tinting printed on the envelope can convey a second type of information.*

*Any print- or physical media-watermark technology can be employed in conjunction with the present invention. Representative watermarking technologies suitable for such use are detailed in the assignee's patent 5,862,260, and in applications 09/074,034, 09/127,502, 09/503,881, 09/562,516, and 09/562,524. A great many other watermarking technologies are familiar to those skilled in the digital watermarking art.*

*In accordance with one aspect of the invention, traceability of digital postage is enhanced by serialization, i.e., embedding a serial number code or other indicia that uniquely and covertly links the printed postage to some device in the users' possession.*

*In one such embodiment, the watermark serves to convey an identifier of a printer, personal computer, postage vault, or other device used in printing postage. The identifier can be a registration* number, a serial number, an account number, etc. The watermark can also serve to convey an identifier associated with particular software employed by the user. And/or, the watermark can also serve to identify the user. Other forensic information can likewise be encoded.

The encoded information can directly correspond to the device, etc., or the relationship can be established through a remote database (e.g., the identifier can be an index number that, when looked-up in a database, yields the registered owner name and address of a particular device).

Typically, such a watermark is "private," i.e., it is readable only to selected classes of persons who have access to secret data, such as a private key. Postal investigators and the like would be able to read such data (e.g., by using a specialized reader system, or by using a conventional reader system equipped with the private information), but the general public would not.

In other embodiments, the watermark is public, but general use thereof is limited because a database needed to interpret the encoded data is not publicly accessible.

As indicated above, this forensic watermark can take various forms. For example, it can form part of the franking indicia printed on the envelope, or can be separate from such indicia. It can be limited to the franking corner of the envelope, or can be located in a different location, or span a larger area. One particular implementation deposits a light splattering of tiny ink droplets over an area. These droplets are sufficient to form a computer-detectable pattern, but are not conspicuous (or preferably even visible) to human observers. In this, and other embodiments, the invisibility of the markings can be enhanced by using inks responsive to ultraviolet or infrared illumination, as more particularly detailed in cited application 09/562,516.

In most applications, the forensic watermark is applied automatically as part of another envelope processing activity. Thus, for example, such functionality can be provided in software used to print addresses on envelopes, or apply digital postage to envelopes. The software can be of the consumer variety (e.g., Microsoft Word), or it can be system or device instructions invoked as part of the printing operation (e.g., printer driver software, or firmware associated with a printer's microprocessor.) As the user-intended information is being printed, the forensic marking is also being applied. Thereafter, if an issue arises as to the source of an envelope, or postal indicia thereon, the forensic information can be checked to aid in such investigation.

In accordance with a second aspect of the invention, security of digital postage against reproduction is enhanced through use of "fragile" digital watermarks.

As noted, a "fragile" digital watermark is one designed not to fully withstand the scanning/printing operations associated with photocopying. (The use of fragile watermarks is detailed in the assignee's applications 09/234,780, 09/287,940, 09/433,104 and 09/498,223, 09/625,577, 60/198,138, 09/645,779, and in three applications filed herewith: Halftone Watermarking and Related Applications <docket 60302>; Watermarks Carrying Content Dependent Signal Metrics for Detecting and Characterizing Signal Alteration <docket 60305>; and Watermarking Recursive Hashes Into Frequency

*Domain Regions <docket 60306>.) If markings (e.g., legitimate franking indicia) incorporating such a watermark are photocopied or otherwise reproduced from one envelope onto a second envelope, the copy will either not fully include the watermark, or the watermark will be changed in a way that indicates it is a copy. Processing equipment in the postal system can be alert to such copies (which are identified by the absence or modification of the fragile watermark), and cull them from the properly-franked mail. Likewise, fraud or counterfeit investigators can use special readers to verify originality and detect copies.*

*A watermark may be made fragile in numerous ways. One form of fragility relies on low watermark amplitude. That is, the strength of the watermark is only marginally above the minimum needed for detection. If any significant fraction of the signal is lost, as typically occurs in photocopying operations, the watermark becomes unreadable.*

*Another form of fragility relies on the watermark's frequency spectrum. High frequencies are typically attenuated in the various sampling operations associated with digital scanning and printing. Even a high amplitude watermark signal can be significantly impaired, and rendered unreadable, by such photocopying operations.*

*The foregoing are but two of many different approaches. The above-cited applications disclose many others. The particular fragile watermark used can be tailored in accordance with the type of scanning and printing anticipated in unauthorized reproduction.*

*Likewise, the fragile watermark can be implemented in various ways. For example, the watermark can be implemented by varying thicknesses of lines, adding dots or speckles or ink, or modulating the brightness of printed pixels. (Such watermarking arrangements are further detailed in applications 09/074,034 and 09/127,502.) Or the watermark can be formed by texturing of the substrate. Such texturing can be applied in various ways. One is by a mechanism integrated with the printer, e.g., one that impresses the medium with a pinch roller or other pressure-applying means. Another is during fabrication of the paper, e.g., by texturing dewatering elements in the paper making machinery to impress a desired pattern on the medium. (One such arrangement is detailed in application 09/437,357, filed November 10, 1999.)*

*As indicated, processing equipment in the postal system (e.g., document sorters and postal processing machines) can routinely scan envelopes bearing digital postage for the presence of the expected fragile watermark. Any envelopes found to be missing the watermark can be culled for investigation. This analysis may include watermark-reading software that infers information about the type of reproduction employed by reference to the attributes of any remaining fragile watermark signal.*

*In accordance with a third aspect of the invention, watermark technology is employed to prevent – outright – the photocopying or other duplication of digital postage. This result is achieved by encoding on envelopes a "do not copy" watermark to which photocopiers, scanners, printers, imaging software, or other computer devices are alert. If such a watermark is encountered, the device will refuse to operate, or will otherwise interfere with the reproduction operation.*

APPENDIX E
09/689,289 filed October 11, 2000

*Such watermark-based "do not copy" systems are further detailed in applications 09/074,034, 09/127,502, 09/185,380 and 09/287,940. The detection of the watermark can occur in various, and preferably numerous, locations in likely reproduction systems. In a desktop computer system, for example, image data may be analyzed for such a watermark by software in the scanner (e.g., scanner driver software), software in the computer (e.g., TWAIN interface software, operating system software, image editing software, internet browser software, printer driver software), and software in the printer (e.g., printer firmware). If any of these detectors encounters image data that has a "do not copy" watermark encoded therein, the detector will interfere with its reproduction (e.g., by discontinuing the process, by scarring the image, by hiding tracer data for later forensic use, etc.)*

*The use of a watermark to indicate that an indicia should not be copied is desirable, but not necessary. Other hallmarks can be employed. For example, devices used in reproduction can be alert to the franking indicia itself and, if encountered, interfere with duplication.*

*In accordance with a fourth aspect of the invention, security is enhanced by associating (cryptographically or otherwise) a digital watermark formed on envelope stock (e.g., by printing or texturing) with data conveyed in a postal franking mark (e.g., a 2D bar code). In such case, for example, the envelope can be authorized for use only in conjunction with a certain printer, a certain postal meter, a certain postal account, a certain software, etc. If the envelope stock is diverted to another use (e.g., used in conjunction with a different postal meter), the discrepancy in the association between the envelope watermark and the postal franking mark can be detected by the postal authorities, and suitable action taken (e.g., alerting the proper owner of the envelope stock of such use).*

*The association between the envelope watermark and the postal indicia can be self-contained (e.g., the association can be demonstrated without reference to external resources), or a remote resource can be employed (e.g., a database can specify that envelope stock X should only be encountered with digital postage from account Y).*

*In a variant embodiment, a franking station can check the watermark already existing on an envelope prior to applying postage. If a correct watermark is not detected, the franking station can decline to apply postage absent supervisory clearance. Unauthorized use of corporate mail accounts for use on personal correspondence may thereby be curbed.*

*In accordance with a fifth aspect of the invention, watermarking on an envelope is employed as an element of a franking mark. Such marking can be confined to the corner location typically associated with postage, but need not be so limited. If the marking extends across the entire envelope – on one side or both – machine processing of the mail by the postal system can be facilitated by obviating the need for positioning the envelope in a certain orientation for reading. In one particular embodiment, an embedded calibration signal associated with certain watermarks (c.f., the cited patent documents) can be used to orient a digital image of the envelope for both watermark reading as well as for other machine processing. In other embodiments, printed features of a franking mark (e.g., vertical and horizontal lines) can be used*

APPENDIX E
09/689,289 filed October 11, 2000

*like graticules to aid in establishing the skew of a watermark printed with the franking mark, thereby aiding decoding of the watermark.*

*To make clear to office personnel that postage has been applied to such an envelope, it is generally desirable that the marking be visible. This can be achieved by increasing the amplitude of the watermark signal so that it appears as a patterned tile (or other shape). Or the watermark can be imperceptible, and other indicia added to indicate that postage has been applied (e.g., text stating "Posted with $0.33, printed in the same area as the watermark, or in a different area).*

*In still other arrangements, a conventional 2D barcode franking mark is subtly changed to, itself, imperceptibly carry the watermark.*

*The information encoded in the franking (or other) watermark can represent a great variety of data. The amount of postage encoded, the date of encoding, the sender's name, address and zip code, the recipient's name, address and zip code, etc., can all be indicated.*

*In some embodiments, all such information is directly encoded in the watermark. In other embodiments, the watermark encodes an abbreviated data set, e.g., including a code number. The code number corresponds to additional information that can be found in a database record accessed by the code – either maintained by the user, by a central authority (e.g., the postal system), or by some remotely accessible database.*

*In accordance with a sixth aspect of the invention, watermarking on an envelope serves as a portal to a corresponding internet site or application (which could be local on the user's PC).*

*As detailed in the assignee's application 09/571,422, filed May 15, 2000, a watermarked document can be held up to a web cam, or scanned by a scanner, and serve to instantly link a user to an Internet site, to invoke an application, etc. (The present assignee offers such services under the Digimarc MediaBridge name.) An envelope marked in this fashion can allow a user to initiate an essentially unlimited range of options.*

*Consider an envelope having the sender's contact information (name, address, zip code, phone number, fax number, email address, etc.) represented by a watermark (either literally, or referring to a database record). A recipient of the envelope may present same to a web cam associated with a personal computer. The camera decodes the watermark, finds it is contact information for a person, and in response automatically adds the contact information to a contact organizer (e.g., Microsoft Outlook) maintained by the computer.*

*Different watermarks may trigger different reactions. Certain of the payload bits in the watermark may indicate the type of data represented, and/or the type of reaction that is appropriate. Responses may be programmed by the sender, so the watermark is the same, but the backend system that is linked to the watermark contains the programming for what response to invoke.*

*One type of watermark may indicate that the encoded information is contact information that is available for loading into a recipient's contact organizer. A second type of watermark may indicate that a*

APPENDIX E
09/689,289 filed October 11, 2000

*delivery confirmation message is to be dispatched to the sender of the envelope. When such an envelope is presented to the receipient's web cam, the associated computer automatically composes an email message confirming delivery of the envelope, and sends it to an address represented in the watermark.*

*A third type of watermark may direct a web browser associated with the recipient's computer to a destination specified by the watermark. The destination web address can provide the recipient with additional information related to the mailing, but updated to the minute. Advertising mailings can thus link to ordering pages, new sale promotions, updated backorder status information, etc. Utility bills can link to summary account information showing payments received or owing, month-to-date charges, etc. The linked web address may present a form soliciting input or response from the envelope recipient, including survey responses, votes, etc.*

*The linked resource needn't convey just textual or graphical information. Entertainment programming can be similarly invoked, e.g., the delivery of previews of tonight's cable television shows, popular music recordings for preview or purchase, etc.*

*A fourth type of watermark may initiate a replenishment of postage in the recipient's digital postage account.*

*The foregoing is just a small sampling of the myriad functions that can be invoked – locally in the recipient's computer, or employing remote resources (e.g., computers accessed over the internet) – in response to presentation of a mailing to a webcam or other imaging device.*

*Some watermarks may correspond to several alternative actions. In such case, the recipient's computer may present a menu from which the recipient can select the desired response. Or the response invoked by presenting the envelope to the web cam may be made dependent on context or environment in which the presentation is made (e.g., time of day, type of device to which web cam is connected – fixed or portable computer, wired or wireless, etc.)*

*In a variant of the foregoing embodiment, an envelope watermark serves to convey an identifier that is used to access a database record having information related to mail processing or delivery. In one particular application, the index number identifies the recipient. Thus, for example, an envelope can be addressed simply by watermarking it with a unique recipient designator, e.g., JOHNQPUBLIC843. Processing equipment in the postal system can read the watermark, query a database with the designator, and determine thereby the recipient's physical address (e.g., street address).*

*In some such embodiments, the physical address information obtained by this database lookup is printed on the envelope by the postal system for the benefit of the ultimate postal delivery person. In other embodiments, the postal delivery person is equipped with reader devices that make such printing superfluous.*

*As noted, an important advantage to this arrangement is that Change of Address cards would be a thing of the past. If a person moves across country, a single record in the database is changed. All mail to*

APPENDIX E
09/689,289 filed October 11, 2000 that recipient automatically is directed to the new physical address. A lifetime postal addressing system can thereby be realized.

In accordance with yet another embodiment, digital watermarks on envelopes can be applied by postal metering devices, or by using common office printers (e.g., laser, ink-jet). In such systems, the watermark embedding functionality may be integrated into the printing device (e.g., by firmware executed by a printer microprocessor, or by dedicated hardware), or can be resident as software on an associated computer system. The software is desirably secured against tampering using various anti-hacking techniques. The production of the digital watermark may not be optional (i.e., it may be applied without user control), and the payload can be tailored in accordance with the amount of postage, device/software/user information, or other application information.

Such a system may also include an application that calibrates printing of the watermark to the user's specific printer or software. For example, the application (which may be a software program) may print a predetermined pattern (watermark or otherwise). The resulting printed media can then be scanned using a scanner (e.g., a digital photocopier or other device) whose transfer function is known. (The application may have profile data on several common scanning devices that can be selectively invoked (e.g., by the user), depending on the particular scanner used.) The scanned image data is then processed by the application to infer the characteristics of the user's printer or software (e.g., its transfer function). Once these characteristics are known, the watermarking process can pre-compensate for such printer/software characteristics so as to produce a watermark whose attributes are largely independent of the printer/software from which it was generated. (E.g., if a printer exhibits attenuated reproduction of high frequency image data, the high frequency components can be pre-emphasized prior to sending the watermark data to the printer. Similarly, if the dot pitch produced by the printer emphasizes particular spatial frequencies, the watermark image data can be pre-compensated to de-emphasize such spatial frequencies.)

In other embodiments, the transfer functions of printing systems commonly used by users can be pre-characterized by the manufacturer, and appropriate compensation of watermark printing can be based thereon. Thus, for example, if a user is printing postage using a Hewlett-Packard LaserJet 8000DN printer, a first set of pre-stored pre-compensation information is utilized. If the user is printing using a Hewlett-Packard DeskJet 860C, a second set of pre-compensation information is utilized, etc. (The specification of the particular printer being used can be left to the user, or it can be determined by reference to data available in the computer system (e.g., by reference to the printer driver file being employed.))

The net result, again, is to make the printed end-product substantially uniform regardless of the idiosyncrasies of particular printing systems. (Further information on characterizing the transfer function of devices to assure reliable watermark communication is found in copending application 60/173,880, filed December 30, 1999.)

APPENDIX E
09/689,289 filed October 11, 2000

*In some embodiments, a hardware security device that is used, e.g., to store postage value (e.g., a digital vault) may also be employed by the watermark embedding system, e.g., as a source of secure and potentially unique data used in encoding the digital watermark (e.g., crypto keys, pseudo-random noise data, etc.). In some such arrangements, the watermark embedding system may make use of data stored in such device primarily for another purpose (e.g., a user ID), and can employ such data in conjunction with the watermarking operation (e.g., as a seed to a random number generator that produces a noise pattern utilized in the watermark encoding).*

*In accordance with still further embodiments of the invention, the principles described herein are also applicable to other printed value documents (e.g., tickets and coupons), especially those that are printed on demand. Such documents may be printed at home, at special kiosks (e.g., in-store), or by commercial printing establishments (i.e., mass produced). Among other functionality, the watermarks in such value documents can be used by investigators to distinguish originals from reproductions (by use of fragile watermarks), to authenticate documents (e.g., in ticket reading machines), and to link to associated internet resources. (An example of the latter is a ticket to a sporting or theatrical event that, when presented to a web cam, allows the user to see an actual or virtual view of the sports arena/stage from the perspective of the ticketed seat.)*

*The watermarks on printed value documents can also be linked to other information (e.g., event date, seat number, product code, etc.) that is textually printed on the document, or present on the document in some machine readable form (e.g., barcodes). In such case, the watermark can be used to detect document alteration by checking for discrepancy between the watermark-encoded information, and that otherwise conveyed by the document.*

*In accordance with still other embodiments, blank paper stock can be digitally watermarked so that printed documents formed by later printing on the stock exhibits desired functionality. (The watermark in the blank stock persists through, and is detectable notwithstanding, subsequent printing.)*

*For example, blank paper stock can be digitally watermarked with a frail watermark that permits the original document to be distinguished from photocopies or other reproductions. Or blank stock used as corporate stationary can be watermarked with data serving as an internet link to the corporation's web site. Or serialized sheets can be employed by a corporation for sensitive memoranda, allowing a printed document to be distinguished from seemingly-identical documents, e.g., permitting the document to be traced back to its original intended recipient*

*As in the examples earlier given, the watermark can be formed by ink (e.g., speckles, or tinting) or by texture. The watermark can be formed on the paper in bulk - in the paper-making process, or can be applied on a per-sheet basis. In the former case, the same watermark payload is encoded on large lots of paper, whereas in the second case, different watermark payloads can be applied to different sheets (e.g., serialized paper). (The later process can be performed by high-speed printing machines specialized for this purpose, e.g., employing page-width ink-jet arrays.)*

APPENDIX E
09/689,289 filed October 11, 2000

*(Watermarking of blank paper stock is referenced in various of the assignee's applications, including 09/127,502 and 09,619,264, as well as in patent 5,822,436.)*

*It will be recognized that the arrangements described above can be combined and hybridized in various ways to economically effect multiple functionality.*

*To provide a comprehensive disclosure without unduly lengthening this specification, the patents and applications cited herein are incorporated herein by reference.*

*Having described and illustrated the principles of the invention with reference to illustrative embodiments, it should be recognized that the invention is not so limited.*

*For example, while digital watermarking typically does not leave any human-apparent evidence of alteration or data representation, certain of the foregoing applications do not require this. The markings used may be visible, and even conspicuous, without impairing essential functionality. Thus, bar codes, data glyphs, OCR markings, and other machine-readable indicia may be substituted, depending on the particular application requirements.*

*While the detailed embodiments were described with reference to desktop computers, it is recognized that such devices will increasingly be supplanted by other digital appliances, including general purpose personal digital assistants, multifunction cell phones, and specialized devices – many of which include integrated optical sensors (e.g., CCD or CMOS cameras). Moreover, the power and utility of the above-detailed embodiments and devices can be further enhanced by employing various wireless communications technologies, including the Bluetooth standard.*

*The implementation of the watermark encoding and decoding systems is straightforward to artisans in the field, and thus not belabored here. Conventionally, such technology is implemented by suitable software, stored in long term memory (e.g., disk, ROM, etc.), and transferred to temporary memory (e.g., RAM) for execution on an associated CPU. In other implementations, the functionality can be achieved by dedicated hardware, or by a combination of hardware and software. Reprogrammable logic, including FPGAs, can advantageously be employed in certain implementations.*

*While the specification makes reference to "paper" and "envelopes," these terms are used in shorthand fashion to refer to articles delivered by the postal service. Thus, postcards (e.g., direct mail cards) and Tyvek articles are meant to be encompassed by such references. Postcards may include multiple watermarks, e.g., a postal-related mark on the "address side," and an internet-linking mark on the other. The two marks may be associated or linked in various manners.*

*Although not described in the context of existing postal meters, it should be recognized that the above-detailed technology is well-suited for implementation with such devices, as they generally use printing techniques that are suitable for digital watermark printing. By retrofitting existing postal meters, a great variety of security and marketing improvements can readily be provided.*

*The reader will recognize that a variety of additional security techniques can be employed in conjunction with the arrangements detailed above. For example, in some applications, it is useful to*

APPENDIX E
09/689,289 filed October 11, 2000

*encrypt the message encoded in the watermark. Encryption provides an additional layer of security to prevent unwanted uses of the encoded information. Some examples of applicable cryptographic methods include RSA, DES, IDEA (International Data Encryption Algorithm), skipjack, discrete log systems (e.g., El Gamal Cipher), elliptic curve systems, cellular automata, etc.*

*These and other cryptographic methods can be used to create a digital signature to place in a watermark message. Public key cryptographic methods employ a private and public key. The private key is kept secret, and the public key is distributed. To digitally sign a message, the originator of the message encrypts the message with his private key. The private key is uniquely associated with the originator. Those users having a public key verify that the message has originated from the holder of the private key by using the public key to decrypt the message.*

*The message may be both encrypted and digitally signed using two stages of encryption. At the encoder, a digital signature stage encrypts at least part of the message with a private key. An encryption stage then encrypts the message with a public key. The decoder reverses the process. First, a decryption stage decrypts the message with a private key corresponding to public key used in the encryption stage at the encoder. Then, a second stage decrypts the output of the previous stage with the public key corresponding to the private key used to create the digital signature.*

*Time and date stamping can be used in conjunction with encryption, or otherwise (e.g., in a watermark). Metadata can similarly be conveyed.*

*If desired, a watermark can be used to track mail (e.g., an envelope or parcel) through the delivery process. At various check points, a camera- or sensor-equipped device reads the watermark, extracts an identifier and logs the identifier along with additional information, such as location, time, etc. This information may be sent and maintained in a database that can be queried to determine the delivery status of the mail. Wireless devices can be employed to read watermarks and report status to a centralized or distributed database.*

*It should be recognized that the particular combinations of elements and features in the above-detailed embodiments are exemplary only; the interchanging and substitution of these teachings with other teachings in this and the incorporated-by-reference patents/applications are also contemplated.*
*In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.*

APPENDIX E
09/689,289 filed October 11, 2000

We claim:

1. A substrate useful in forming a printed object, characterized in that the substrate has been processed to encode a steganographic digital watermark pattern thereon that does not impair subsequent use of the substrate, yet encodes multi-bit binary data, the presence of said multi-bit binary data not being apparent to a human observer of the printed object, said steganographic pattern being detectable by visible-light scanning of the printed object to yield data from which the multi-bit binary data can be recovered.

2. The substrate of claim 1 wherein said processing locally changes an ink absorption attribute of the substrate.

3. The substrate of claim 1 wherein the digital watermark pattern degrades when photocopied, so that the printed object can be distinguished from a photocopy thereof.

4. The substrate of claim 3 comprising a second digital watermark pattern, the second pattern being robust against photocopying.

5. The substrate of claim 1 in which the substrate has first and second sides, and both sides have watermark patterns.

6. The substrate of claim 1 wherein a first region of the substrate conveys a first watermark payload, and a second, different region of the substrate conveys a second, different watermark payload.

7. The substrate of claim 1 wherein said multi-bit binary data comprise an identifier, said identifier serving to convey information indicative of an electronic address.

8. The substrate of claim 7 in which the identifier comprises a pointer into a remote data structure, the remote data structure storing an electronic address corresponding to said substrate.

9. An invoice printed on the substrate of claim 7.

10. The substrate of claim 1 wherein the plural bits of digital information serve to identify the type of substrate to a printer, so that the printer can tailor print parameters accordingly.

11. The substrate of claim 1 in which the watermark pattern is formed on a side of said substrate opposite a side to which final end-user printing is later applied.

12. The substrate of claim 1, wherein the substrate comprises an envelope.

13. The substrate of claim 1, wherein the substrate comprises stationery.

14. The substrate of claim 1, wherein the substrate comprises blank magazine or newspaper printing stock.

15. The substrate of claim 1 in which the steganographic digital watermark pattern comprises an arrangement of line segments extending between virtual squares in a virtual grid of such squares that extends across at least part of said substrate, wherein each of said line segments has one end in one of said virtual squares and a second end in an adjoining virtual square.

16. The substrate of claim 15 wherein:

said line segments are straight and of differing lengths;

the number of line segments equals the number of virtual squares; and at least some of said line segments are not connected, at either end, to others of said line segments.

17. A method of processing a blank substrate prior to formation of a printed object, the method comprising encoding the substrate with a steganographic digital watermark pattern that does not impair subsequent use of the substrate, yet encodes multi-bit binary data, the presence of said multi-bit binary data not being apparent to a human observer of the printed object, said steganographic pattern being detectable by visible-light scanning of the printed object to yield data from which the multi-bit binary data can be recovered.

18. The method of claim 17 wherein the digital watermark pattern is designed to degrade when photocopied, so that the original printed object can be distinguished from a photocopy thereof.

19. The method of claim 17 wherein the method further includes passing the processed substrate through a printer for end-user printing, recognizing the pattern thereon, and tailoring a printing parameter accordingly.

20. The method of claim 17 in which the watermark pattern is formed on a side of said substrate opposite a side to which final end-user printing is later applied.

21. In a method of forming a printable substrate that includes applying plural layers to a film substrate, an improvement comprising tailoring the tone or density of at least one of said layers to form a machine readable indicia encoding plural bits of digital data, the method including mathematically transforming the plural bits of digital data into a two-dimensional array of values, and defining the indicia by reference to the array of values.

22. The method of claim 21 in which the film substrate is translucent, and the layers are opacification layers.

* * * * *